US009924142B2

(12) United States Patent
Ni et al.

(10) Patent No.: US 9,924,142 B2
(45) Date of Patent: Mar. 20, 2018

(54) CAMERA ARRAY SYSTEMS INCLUDING AT LEAST ONE BAYER TYPE CAMERA AND ASSOCIATED METHODS

(71) Applicant: OmniVision Technologies, Inc., Santa Clara, CA (US)

(72) Inventors: Yongshen Ni, San Jose, CA (US); Guansong Liu, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 329 days.

(21) Appl. No.: 14/086,731

(22) Filed: Nov. 21, 2013

(65) Prior Publication Data

US 2014/0139642 A1 May 22, 2014

Related U.S. Application Data

(60) Provisional application No. 61/729,217, filed on Nov. 21, 2012.

(51) Int. Cl.
*G06T 7/00* (2017.01)
*G06T 7/40* (2017.01)
(Continued)

(52) U.S. Cl.
CPC ............ *H04N 9/09* (2013.01); *G06T 7/593* (2017.01); *G06T 7/90* (2017.01); *H04N 9/045* (2013.01); *H04N 13/0239* (2013.01); *H04N 13/0242* (2013.01); *G06T 2207/10024* (2013.01); *H04N 5/2258* (2013.01); *H04N 13/0246* (2013.01); *H04N 13/0257* (2013.01); *H04N 2013/0081* (2013.01)

(58) Field of Classification Search
CPC ......... G06T 2207/10024; G06T 7/0075; G06T 7/408; H04N 13/0239; H04N 13/0242; H04N 13/0246; H04N 13/0257; H04N 2013/0081; H04N 5/2258; H04N 9/045; H04N 9/09
USPC .................... 348/223.1, 48; 382/154, 162
See application file for complete search history.

(56) References Cited

U.S. PATENT DOCUMENTS

2002/0009218 A1* 1/2002 Chapman ............... G01N 21/88
382/141
2003/0012277 A1* 1/2003 Azuma .................... G06T 7/70
375/240.08

(Continued)

FOREIGN PATENT DOCUMENTS

CN        1663285 A      8/2005

OTHER PUBLICATIONS

Taiwanese Patent Application 1102142493 Office Action dated Apr. 23, 2015 with Translation, 8 pages.

(Continued)

*Primary Examiner* — Deirdre Beasley
(74) *Attorney, Agent, or Firm* — Lathrop Gage LLP

(57) ABSTRACT

A method for processing a plurality of images of a scene recorded from different vantage points, where the plurality of images includes a color reference image captured by a Bayer type camera and at least one additional image, the method including (a) registering at least a portion of the plurality of images, and (b) generating a unitary color image from the plurality of images, wherein color information of the unitary color image is determined exclusively from the color reference image.

22 Claims, 18 Drawing Sheets

(51) Int. Cl.
*H04N 13/02* (2006.01)
*H04N 9/09* (2006.01)
*H04N 9/04* (2006.01)
*G06T 7/593* (2017.01)
*G06T 7/90* (2017.01)
*H04N 5/225* (2006.01)
*H04N 13/00* (2018.01)

(56) References Cited

U.S. PATENT DOCUMENTS

| | | | |
|---|---|---|---|
| 2006/0283952 A1* | 12/2006 | Wang | G06K 7/10722 235/462.01 |
| 2007/0167770 A1* | 7/2007 | Miyaki | A61B 8/06 600/437 |
| 2008/0123946 A1* | 5/2008 | Kiuchi | H04N 1/62 382/164 |
| 2008/0177417 A1* | 7/2008 | Kasuga | G05B 19/41805 700/213 |
| 2011/0074931 A1* | 3/2011 | Bilbrey | H04N 5/2258 348/48 |
| 2011/0085173 A1* | 4/2011 | Waller | G01J 9/00 356/484 |
| 2012/0044328 A1* | 2/2012 | Gere | H04N 9/09 348/48 |
| 2012/0075432 A1* | 3/2012 | Bilbrey | G01J 4/00 348/48 |
| 2012/0154541 A1 | 6/2012 | Scott | |
| 2012/0188389 A1* | 7/2012 | Lin | H04N 5/2258 348/218.1 |
| 2012/0307018 A1* | 12/2012 | Damstra | H04N 13/0217 348/49 |
| 2013/0016251 A1* | 1/2013 | Ogasahara | H04N 9/09 348/238 |
| 2013/0041216 A1* | 2/2013 | McDowall | G02B 5/04 600/109 |
| 2013/0041221 A1* | 2/2013 | McDowall | A61B 1/00096 600/111 |
| 2013/0041226 A1* | 2/2013 | McDowall | A61B 1/00009 600/166 |
| 2013/0129247 A1* | 5/2013 | Parker | G06K 9/40 382/264 |
| 2013/0147797 A1* | 6/2013 | Tanaka | H04N 13/026 345/419 |

OTHER PUBLICATIONS

Taiwanese Patent Application No. 102142493 Notice of Allowance dated Dec. 22, 2015, 3 pages.
Chinese Patent Application 201310590776.9 Office Action dated Oct. 28, 2015 with Translation, 20 pages.

* cited by examiner

CAMERA ARRAY SYSTEMS INCLUDING AT LEAST ONE BAYER TYPE CAMERA AND ASSOCIATED METHODS

CROSS-REFERENCE TO RELATED APPLICATIONS

The present application claims the benefit of priority to U.S. Provisional Application No. 61/729,217 filed Nov. 21, 2012, which is incorporated herein by reference in its entirety.

BACKGROUND

Camera systems including multiple cameras are used to image a common scene from different vantage points. The images captured by such camera systems may be combined to provide information not obtainable from any individual camera included in the camera system. Some applications are focused on capturing video at frame rates significantly in excess of the frame rate associated with a single camera, which is useful for capturing video of fast moving objects. In other applications, cameras of different types are used to obtain different types of information. For instance, a camera system may include one camera for capture of color images and another camera to capture of monochrome images. Camera systems including multiple cameras have proven particularly useful in stereo camera applications.

Stereo cameras consist of two or more camera systems spatially offset from each other. Each camera captures an image of the same scene and subsequent analysis of the recorded images provides distance information in addition to standard two-dimensional images. The configuration mimics that of a pair of eyes. Humans perceive distance by comparing visual information taken in through the eyes. The distance between the eyes results in slight differences in the images formed in the two eyes. The brain processes this disparity to determine the distance to various objects in the scene and provide depth perception. Similarly, two cameras placed next to each other and viewing the same scene will capture slightly different images due to the distance between the two cameras. Objects from the scene will appear in slightly different positions in the images. If the cameras are spaced apart from each other by a known distance, the three-dimensional location of objects in the scene relative to the stereo camera can be determined from the captured images by triangulation.

Stereo cameras are being found in an increasing number of applications requiring image capture and distance information for objects in the scene. For example, stereo cameras are being implemented in cars to help prevent accidents by monitoring the surroundings and determining if the car is getting too close to other objects or people. In addition to location and distance information, stereo cameras can provide the actual size of objects by applying the determined distance between the object and the stereo camera to the size of the object, as measured in the image. This feature is useful in applications requiring object recognition, such as surveillance, machine vision, and robotic equipment. Some stereo cameras include an additional camera that provides a color image of the scene viewed by the stereo camera.

SUMMARY

A method for processing a plurality of images of a scene recorded from different vantage points, where the plurality of images includes a color reference image captured by a Bayer type camera and at least one additional image, the method including (a) registering at least a portion of the plurality of images, and (b) generating a unitary color image from the plurality of images, wherein color information of the unitary color image is determined exclusively from the color reference image.

A camera system including (a) a camera array for capturing a plurality of images of a scene from a plurality of vantage points, where the camera array includes at least one color camera with a Bayer type color filter array, (b) a processor, (c) a memory communicatively coupled to the processor, and (d) an image combination module including machine-readable instructions stored in the memory, that, when executed by the processor, generate a unitary color image of the scene with color information obtained exclusively from the image captured by a selected one of the at least one color camera.

A system for processing a plurality of images of a scene recorded from different vantage points, where the plurality of images includes a color reference image captured by a Bayer type camera and at least one additional image, the system including (a) a processor, (b) a memory communicatively coupled to the processor, and (c) an image combination module, including machine-readable instructions stored in the memory, that, when executed by the processor, generate a unitary color image of the scene with color information obtained exclusively from the color reference image, the unitary color image being registered to the color reference image.

DETAILED DESCRIPTION OF THE EMBODIMENTS

Figure 1:
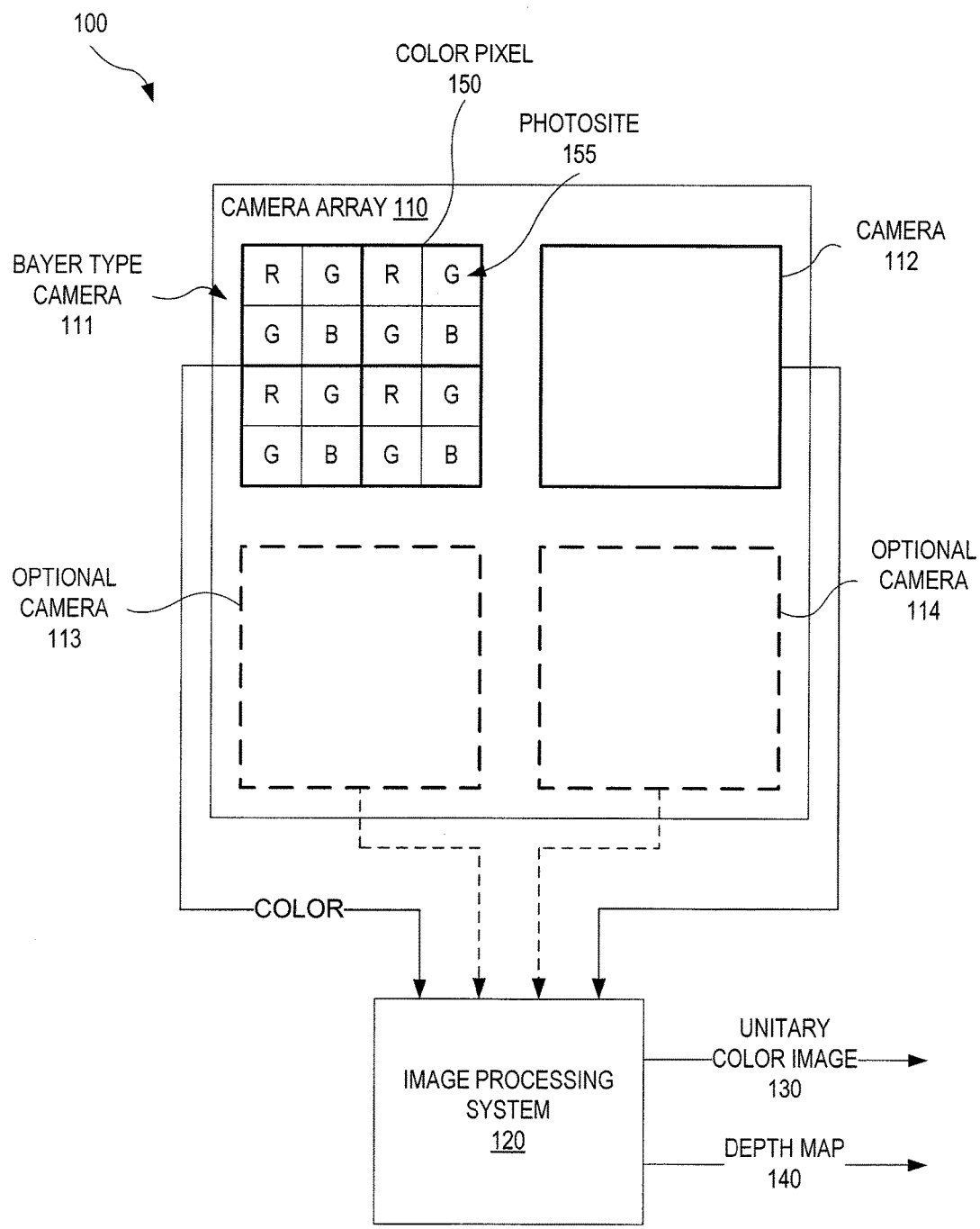
FIG. 1 illustrates one exemplary camera system including a camera array, with at least one Bayer type camera, and an image processing system for generation of a unitary color image and a depth map, according to an embodiment.

FIG. 1 illustrates a camera array system 100 including one exemplary camera array 110 and an image processing system 120. Camera array 110 includes a Bayer type camera 111, a camera 112, and optional cameras 113 and 114. Each of Bayer type camera 111, camera 112, and optional cameras 113 and 114 include an imaging objective (not shown in FIG. 1) and a digital image sensor, e.g., a charge coupled devices (CCD) image sensor or a complementary metal oxide semiconductor (CMOS) image sensor for capturing images of a scene. Bayer type camera 111, camera 112, and optional cameras 113 and 114 view a common scene from different vantage points, thereby providing stereo imaging capability. Image processing system 120 processes a set of images, each captured by a respective, individual camera of camera array 110, to generate a single, unitary color image 130 and a depth map 140. Depth map 140 indicates the distance from camera array 110 to scene objects captured in the images.

The image sensor of Bayer type camera 111 is equipped with a Bayer type color filter array. Each color pixel 150 of Bayer type camera 111 is composed of photosites 155 (one exemplary photosite is labeled in FIG. 1) sensitive to different colors of light, for example red, green, and blue. Photosites 155 provide a spectral analysis of the light, which results in color identification of light detected by color pixel 150. In the case of a conventional Bayer filter array, as illustrated in FIG. 1, a color pixel, e.g., color pixel 150, is composed of a red photosite (R), two green photosites (G), and a blue photosite (B). Other Bayer type color filter arrays include, for example, an RGBE filter array having one red, one green, one blue, and one emerald photosite in each color pixel, a CYYM filter array having one cyan, two yellow, and one magenta photosite in each color pixel, and a CYGM filter array having one cyan, one yellow, one green, and one magenta photosite in each color pixel.

Image processing system 120, generates unitary color image 130 from a consideration of a plurality of images. However, the color information in unitary color image 130 is extracted exclusively from the image captured by Bayer type camera 111. In certain prior art systems for generating a unitary image from multi-camera systems, different cameras are sensitive to different colors. Hence, determining the color of a pixel in a resulting unitary color image requires combining information from more than one camera. This frequently introduces color artifacts in situations where a foreground object in the imaged scene is so close to the camera system that it occludes the view of a distant background for some of the cameras used for color identification. This results in incomplete color information for the occluded portion of the distant background. If, for example, the foreground object occludes a portion of a distant blue sky in the image captured by the camera providing information for the blue portion of the spectrum, the occluded portion of the distant blue sky will lack the color blue. System 100 of FIG. 1 overcomes this issue by assigning color to unitary color image 130 exclusively from Bayer type camera 111. A method for generating unitary color image 130 is disclosed in FIG. 11.

Image processing system 120 generates depth map 140 from a consideration of at least two images in an image set. For all objects, or points, of a scene captured in an image by Bayer type camera 111, image processing system 120 locates the same scene object or point in at least one of camera 112 and optional cameras 113 and 114. The distance to an object, or portion thereof, in a scene imaged by camera array 110 is determined by triangulation of its imaged positions as measured by at least two cameras. Any feature present in unitary color image 140 is, per design, also present in the image captured by Bayer type camera 111. Camera array 110 is constructed such that the spectral range spanned by photosites 155 of color pixel 150 is covered by other cameras of camera array 110. In an embodiment, camera array 110 includes at least one "clear camera", e.g., camera 112, in addition to Bayer type camera 111. Each pixel of the clear camera is sensitive at least to light in the spectral range spanned by photosites 155 of color pixel 150. This ensures that any feature found in unitary color image 130, regardless of its color, is present in at least two images, thereby enabling depth calculation for this feature. In another embodiment, camera array 110 includes, in addition to Bayer type camera 111, a plurality of cameras, e.g., camera 112 and optional cameras 113 and 114, each of which is sensitive to a portion of the spectral range spanned by photosites 155 of color pixel 150, and in combination covering at least the spectral range spanned by photosites 155 of color pixel 150. This enables depth calculation of the feature by triangulation, as the feature is present in at least two images. In certain embodiments, Bayer type camera 111 includes a Bayer filter (photosites R, G, B, and G as illustrated in FIG. 1), while camera 112 and optional cameras 113 and 114 include a camera sensitive to red light, a camera sensitive to green light, and a camera sensitive to blue light.

Figure 2:
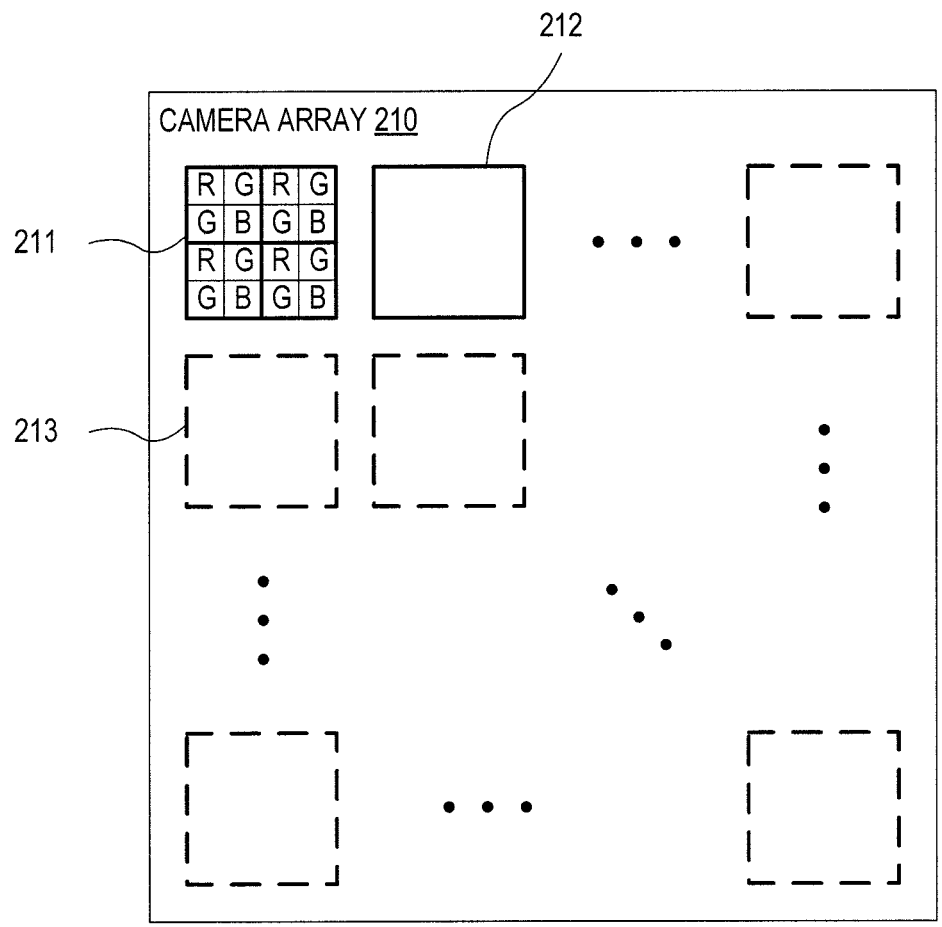
FIG. 2 illustrates one exemplary camera array including at least one Bayer type camera, according to an embodiment.

FIG. 2 illustrates a camera array 210, which is a general form of the camera arrays relevant for the present disclosure. Camera array 110 of FIG. 1 is an embodiment of camera array 210 and the discussion of FIG. 1, including the generation of unitary color image 130 and depth map 140 by image processing system 120, applies to a system based on camera array 210. Camera array 210 includes a Bayer type camera 211, a camera 212, and any number of optional cameras 213 (only one labeled in FIG. 2).

While FIG. 2 illustrates individual cameras placed on a regular grid, the individual cameras may be arranged in any configuration as long as they view a common scene. The individual cameras need not be in the same plane but their relative positions must be known. Each of camera 212 and optional cameras 213 is, for example, a clear camera, a color coated camera with all pixels having identical color sensitivity, an infrared camera, or a Bayer-type camera. In an embodiment, the images captured by camera 212 and optional cameras 213 are captured at the same magnification as that of the image captured by Bayer type camera 211. In another embodiment, at least one of camera 212 and optional cameras 213 captures image at a magnification different from that of Bayer type camera 211. In a further embodiment, at least one of camera 212 and optional cameras 213 captures images at a different brightness setting different from that of Bayer type camera 211, e.g., different exposure time, gain setting, or aperture stop, in order to extend the dynamic range of the camera system. In certain embodiments, camera 212 and/or optional cameras 213 capture images of a pixel resolution different from that of the image captured by Bayer type camera 211. Camera array 210 may be formed on a single dye providing robust alignment between the individual cameras, i.e., Bayer type camera 211, camera 212, and optional cameras 213.

Figure 3:
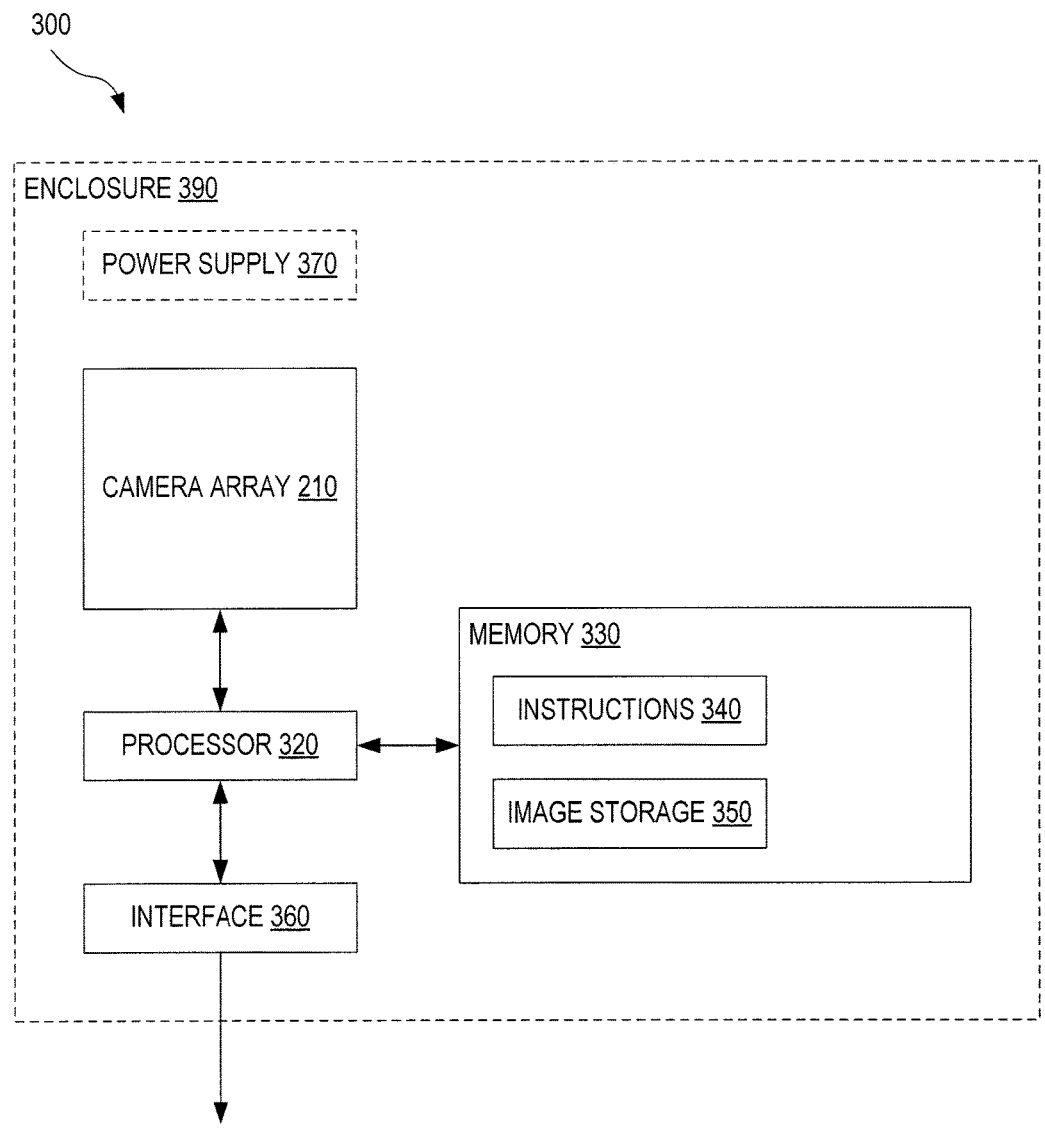
FIG. 3 illustrates one exemplary camera system including a camera array with at least one Bayer type camera, according to an embodiment.

FIG. 3 illustrates a system 300 for image capture by a camera array, including at least one Bayer type camera, and subsequent processing of captured images. System 300 includes camera array 210 of FIG. 2. In system 300, camera array 210 is in communication with a processor 320 for processing of images received from camera array 210, and optionally for control of camera array 210. Processor 320 is in communication with a non-volatile memory 330 that includes machine-readable instructions 340 for processing of images received from processor 320, and an image storage 350 for storage of images captured by camera array 210 and, optionally, images generated by processor 320.

In an embodiment, machine readable instructions 340 contains at least algorithms for the generation of unitary color image 130 and depth map 140 of FIG. 1. In this case, processor 320 and memory 330 includes the functionality of image processing system 120 of FIG. 1. The discussion of FIG. 1 is extended to this embodiment of system 300. Processor 320 is further in communication with an interface 360 for communication of images captured by camera array 210 and/or data generated by processor 320, e.g., unitary color image 130 and depth map 140. Interface 360 may communicate images and other data to a user or an external computer for further processing and/or storage of data. In certain embodiments, camera array 210, processor 320, memory 330, and interface 360 are enclosed in an enclosure 390. Enclosure 390 may be a camera body. Further contained within enclosure 390 may be a power supply 370.

Optionally, portions of the functionality of processor 320 and memory 330 is provided by an external computer (not shown in FIG. 3) in communication with interface 360.

Figure 4:
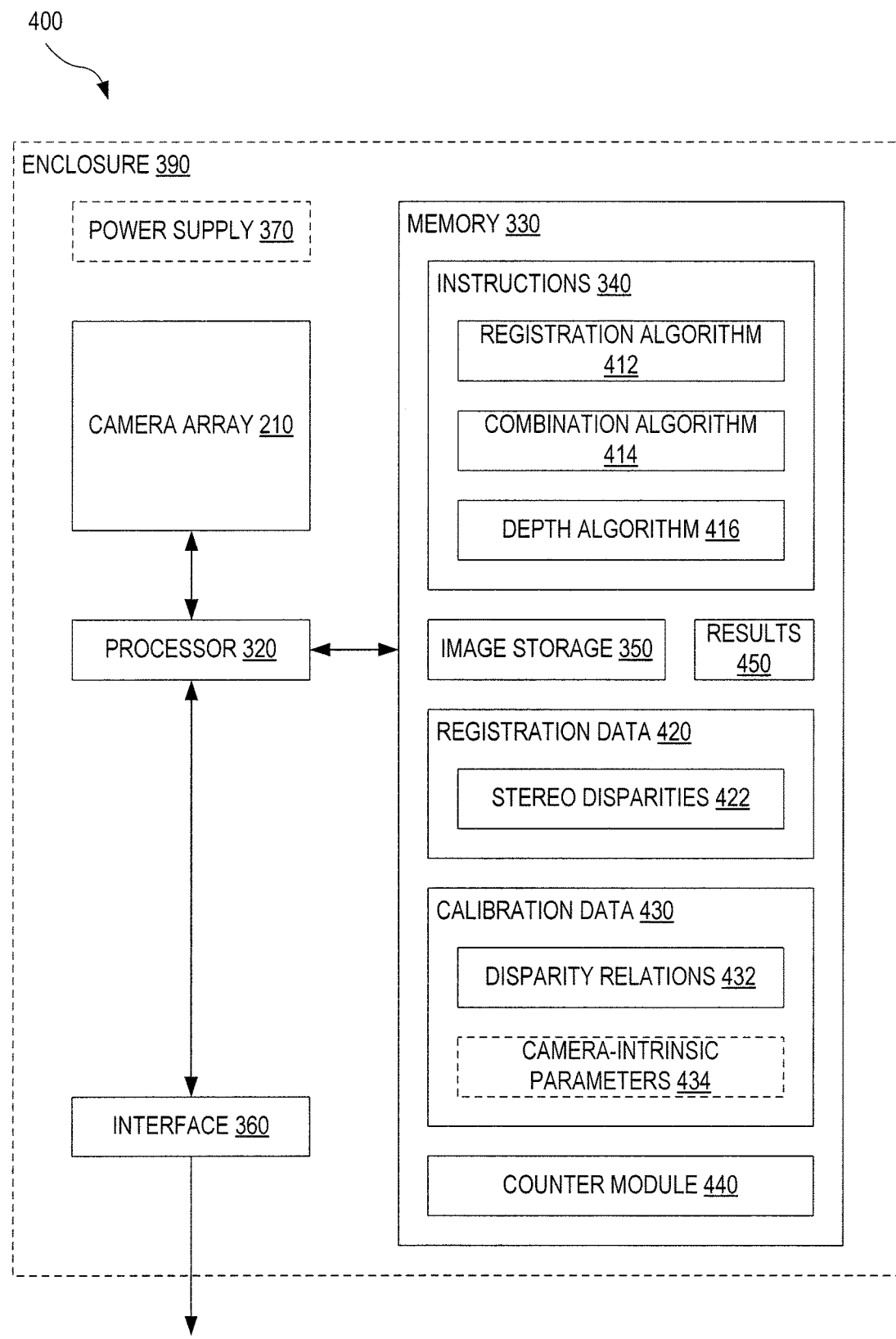
FIG. 4 illustrates one exemplary embodiment of the camera system of FIG. 3.

FIG. 4 illustrates a system 400 for image capture and processing, which is an embodiment of system 300 of FIG. 3. In system 400, machine-readable instructions 340 includes algorithms for processing of a plurality of images of the same scene captured by camera array 210, each image representing a view of the scene from a different vantage point. The algorithms included in instructions 340 are: registration algorithm 412 for registration of the plurality of images; combination algorithm 414 for generating a unitary image, e.g., unitary color image 130 of FIG. 1, based on the plurality of images; and depth algorithm 416 for generating a depth map, e.g., depth map 140 of FIG. 1, based on the plurality of images. Memory 330 further includes registration data 420 for storing registration data generated by processor 320 according to instructions in registration algorithm 412. Registration data 420 includes stereo disparities 422. Memory 330 further includes calibration data 430 used by processor 320 in the processing of images received from camera array 210. Calibration data 430 includes disparity relations 432 that are used by processor 320 to execute registration algorithm 412. Further, memory 330 includes a counter module 440 used by processor 320 in the execution of instructions 340, and results 450 for storage of results generated by processor 320 according to instructions 340.

Figure 5:
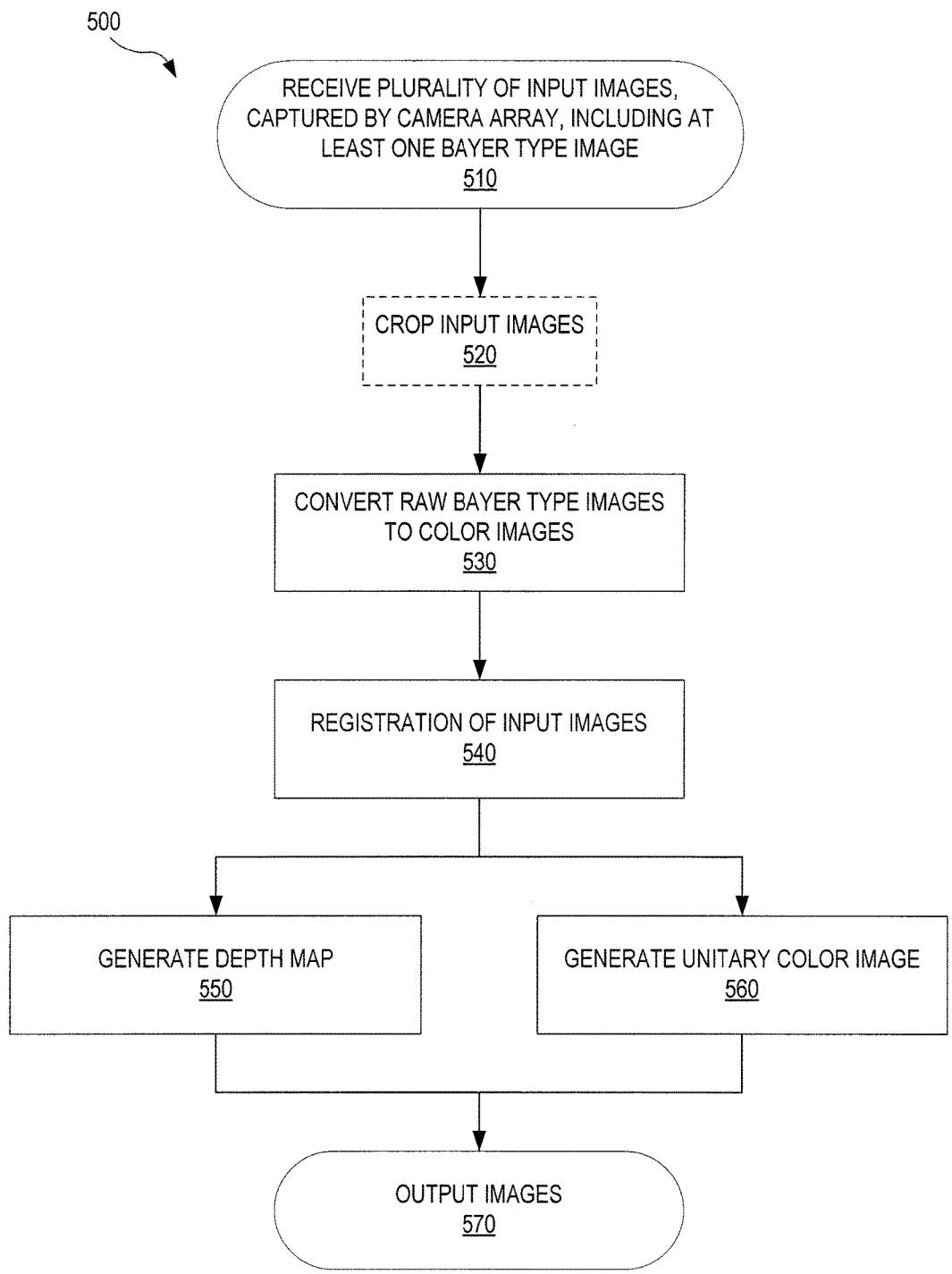
FIG. 5 illustrates one exemplary method for generating a depth map and a unitary color image from a plurality of input images including at least one Bayer type image, according to an embodiment.

FIG. 5 illustrates a method 500 for generating a unitary image and a depth map from a plurality of images of a scene. Each image represents a view of the scene from a different vantage point and at least one of the images is a Bayer type image. Method 500 is used, for example, by processor 320 of FIGS. 3 and 4 to process images received from camera array 210 (FIG. 2), to generate unitary color image 130 and depth map 140 of FIG. 1.

In a step 510, a plurality of input images are received from a camera array. Optionally, the plurality of input images are retrieved from a stored location as opposed to directly from the camera array. Each image represents a view of the same scene from a different vantage point. The images may be captured by camera array 210 (FIG. 2) and received by processor 320 (FIGS. 3 and 4). In an optional step 520, the input images are cropped to remove image portions of no interest, e.g., portions of the image subject to vignetting or excessive distortion. Step 520 is, for example, executed by processor 320 (FIGS. 3 and 4) according to instructions 340 (FIGS. 3 and 4). In an optional step 530, raw Bayer type images are converted to color images. Optional step 530 is performed if Bayer type images are received in a raw format where the data from individual photosites, e.g, photosites 155 (FIG. 1) has not yet been combined to define the color of pixels, e.g., color pixel 150 (FIG. 1). Generally, optional step 530 includes white balancing and demosaicing. Optional step 530 is executed, for example, by processor 320 (FIGS. 3 and 4) according to instructions 340.

In a step 540, the plurality of input images are registered. Since each image represents a view of the scene from a different vantage point, objects of the scene are imaged onto different locations in each of the plurality of images. These differences are known as stereo disparities.

Figure 6:
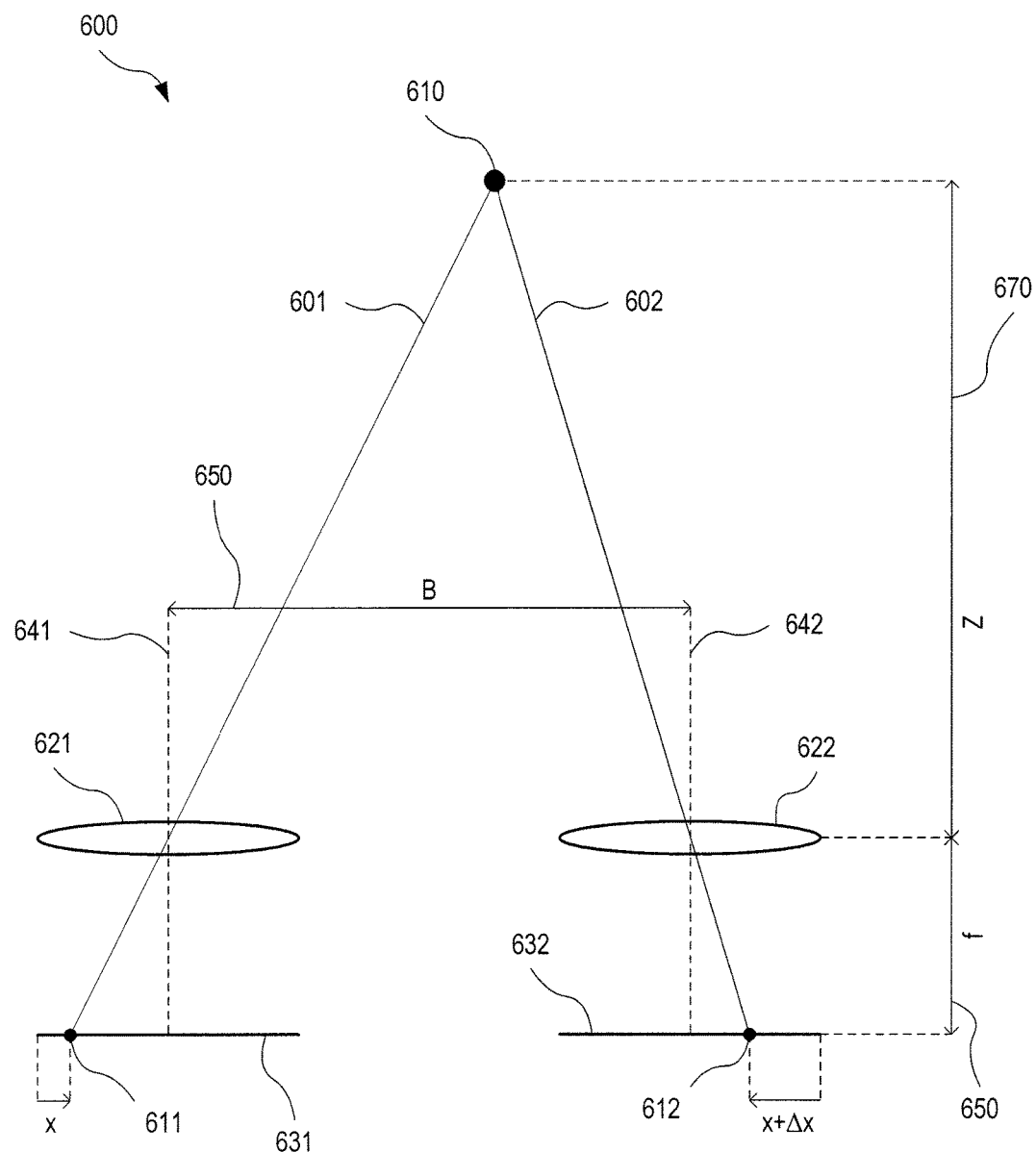
FIG. 6 is a diagram relating the stereo disparity of a scene object to the depth of the scene object and properties of the camera system, according to an embodiment.

FIG. 6 is a diagram 600 showing the stereo disparity associated with an object 610 in a scene imaged by an imaging objective 621 onto a pixel array 631 and by an imaging objective 622 onto a pixel array 632. The optical axes 641 and 642 of imaging objectives 621 and 622, respectively, are separated by a stereo baseline 650 of length B. As indicated by line 601, imaging objective 621 images object 610 onto a location 611 on pixel array 631, at a distance x from an origin of pixel array 631. Likewise, as indicated by line 602, imaging objective 622 images object 610 onto a location 612 on pixel array 632, at a distance x+Δx from an origin of pixel array 632. The stereo disparity associated with object 610, and referenced to its imaged location 611 on pixel array 631, is Δx. The depth of object 610 is defined as the distance z (labeled 670) from object 610 to imaging objectives 621 and 622 in a direction parallel to their respective optical axes 641 and 642. The depth of object 610 relates to the stereo disparity Δx through the equation:

$$z = B \times f / \Delta x, \quad \text{(Eq. 1)}$$

where f is the focal length (labeled 650) of imaging objectives 621 and 622. Diagram 600 and the associated derivation of the relation between depth and stereo disparity is based on two identical imaging systems with identical thin lens imaging objectives, parallel optical axes, and coplanar pixel arrays. Diagram 600, the discussion thereof, and Eq. 1 is readily adapted to account for more complex scenarios, without departing from the scope hereof.

Returning to method 500 of FIG. 5, step 540 includes determining sets of corresponding locations, each corresponding location being a location of the same scene object (or point) in a respective input image are determined. Locations may be limited to actual pixel locations or be determined at super-pixel resolution. Step 540 further includes calculating stereo disparities associated with points in the imaged scene, e.g., stereo disparity Δx associated with object 610 (FIG. 6). The stereo disparities are referenced to the reference image. In one embodiment, if a scene object is found in more than two images, all determined corresponding locations are used to determine a single, associated stereo disparity. The stereo disparities are stored to memory, e.g., to registration data 420 (FIG. 4) as stereo disparities 422 (FIG. 4). In an embodiment, registration data indicating corresponding sets of locations are stored to memory, e.g., as registration data 420. In an alternative embodiment, only stereo disparities are stored to memory and corresponding sets of locations needed in subsequent steps of method 500 are deduced from such stereo disparities, e.g., stereo disparities 422. Step 540 is, for example, executed by processor 320 (FIGS. 3 and 4) according to instructions in registration algorithm 412 (FIG. 4).

In a step 550, a depth map, e.g., depth map 140 of FIG. 1, indicating the depth of objects in the imaged scene is generated. The depth calculations are based on the stereo disparities determined in step 540, e.g., stereo disparities 422 (FIG. 4). The depth calculation may utilize Eq. 1. Step 550 is, for example, executed by processor 320 (FIGS. 3 and 4) according to instructions in depth algorithm 416 (FIG. 4).

In a step 560, a unitary color image, e.g., unitary color image 130 of FIG. 1, is generated from the plurality of input images by combining pixels from different input images according to the registration determined in step 540. The color of each pixel in the unitary color image is assigned according to the color of a corresponding pixel in the reference image. In an embodiment, the gray scale value of each pixel in the unitary color image is found by combining the intensities of all corresponding locations in the plurality of input images, where corresponding locations have been determined in step 540. In an embodiment, corresponding locations are deduced from stereo disparities determined in step 540. In another embodiment, if, in step 540, corresponding locations are determined at super-pixel resolution, the intensity of a "corresponding location" constitutes a weighted average of intensities of pixels located nearest this location. Step 560 is, for example, executed by processor 320 (FIGS. 3 and 4) according to instructions in combination algorithm 414 (FIG. 4).

In a step 570, the unitary color image and the depth map generated in steps 560 and 550, respectively, are outputted. Step 570 is executed, for example, by processor 320 using interface 360 (FIGS. 3 and 4). Step 570 may be executed as two separate steps, one outputting the depth map and another outputting the unitary color image, as they become available. Steps 550 and 560 may be executed in series or in parallel.

In certain embodiments, one or more of steps 540, 550, and 560 utilize a reference Bayer type image selected from the at least one Bayer type image. In such embodiments, stereo disparities calculated in step 540 are referenced to the locations in the reference Bayer type image. Likewise, in certain embodiments, the depth map generated in step 550 is referenced to the reference Bayer type image such that each pixel in the depth map indicates the depth of an object in the same location of the reference Bayer type image. The same principle may be applied to step 560 such that, in certain embodiments, the location of a scene object in the unitary color image is the same as its location in the reference Bayer type image. However, since pixel intensities of the unitary color image are determined from a plurality of images, the spatial resolution of the object may be improved in the unitary color image as compared to the reference Bayer type image. In embodiments of 560 utilizing a reference Bayer type image, the color of a pixel in the unitary color image is set to the color of the same pixel in the reference Bayer type image.

Figure 7:
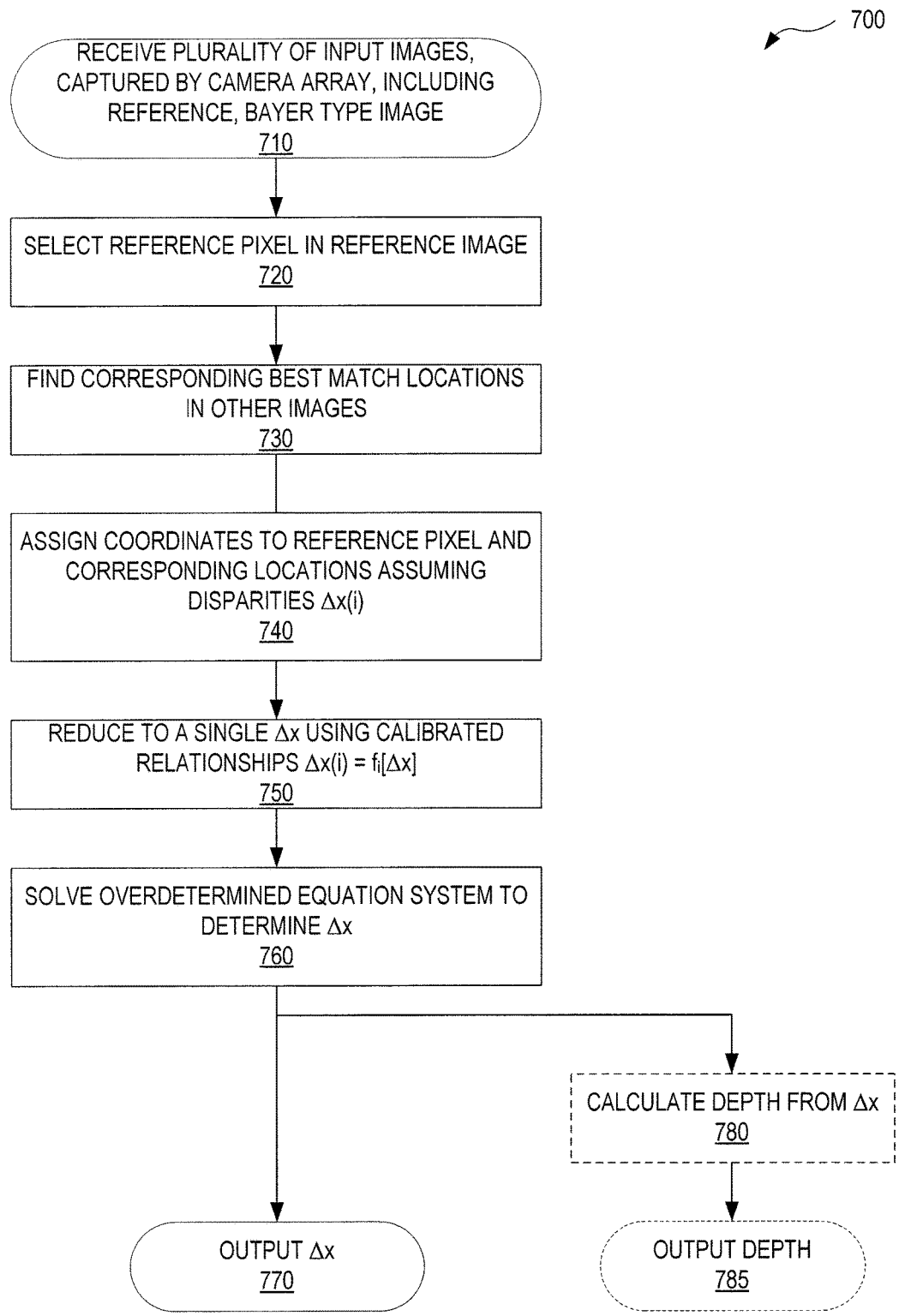
FIG. 7 illustrates one exemplary method for determining a stereo disparity of a scene object identifiable in a plurality of input images including a reference, Bayer type image, where the images are captured by a camera array, according to an embodiment.

FIG. 7 illustrates a method 700 for determining a stereo disparity of an object (or point) in a scene captured in images captured by a camera array. The input images represent images of a common scene viewed from different vantage points and include at least one Bayer type image, one of which defines a reference image. It is assumed that the scene object is identifiable in at least three images, including the reference, Bayer type image. Accordingly, at least two different image pairs are available for stereo disparity determination. As discussed below, the relationships between stereo disparities derived from different image pairs have been calibrated prior to execution of method 700, for example during manufacturing of the camera array used to capture the input images. Method 700 utilizes these pre-calibrated relationships between stereo disparities to determine a single stereo disparity based on a consideration of all images showing the scene object. This adds robustness over a method that utilizes only two of the images containing the scene object. Method 700 constitutes a portion of one exemplary embodiment of step 540 of method 500 (FIG. 5) and may be stored as a portion of registration algorithm 412 of FIG. 4.

In a step 710, a plurality of input images, including a reference, Bayer type image, are received either from a camera array or from a stored location. For example, processor 320 (FIGS. 3 and 4) receives the plurality of input images from camera array 210 (FIG. 2) or from image storage 350 (FIGS. 3 and 4). In a step 720, a color pixel, in the following denoted the reference pixel, is selected in the reference, Bayer type image. The reference pixel coincides with the image of a scene object (or point) that is present in at least two additional images. The reference pixel is, for example, color pixel 150 of Bayer type camera 111 of FIG.

1. Step 720 may be executed by processor 320 (FIGS. 3 and 4) and may define a portion of registration algorithm 412 (FIG. 4).

In a step 730, a set of locations corresponding to the reference pixel are identified in the other input images. Given the premise that the scene object imaged onto the reference pixel selected in step 720 is identifiable in at least two other images, at least two corresponding locations are determined in step 730. Each of the locations corresponding to the reference pixel refers to a respective one of the non-reference input images and coincide with a best match to an image of the scene object of the reference pixel. Since stereo disparities may be of any size and is not limited to an integer number of pixels, the locations corresponding to the reference pixel may not be centered on an image pixel. In an embodiment, the locations, corresponding to the reference pixel, determined in step 730 are restricted to pixel coordinates. In another embodiment, the locations, corresponding to the reference pixel, are assigned at super-pixel resolution. The vantage point differences between the cameras used to capture the input image may result in image-to-image differences in the image representation of a given scene object. Hence, step 730 determines locations that are the best match to the reference pixel. Note also that the input images may be of different resolution. For example, non-Bayer type images may have greater pixel resolution than Bayer type images. Step 730 may be a portion of registration algorithm 412 (FIG. 4) and may be executed by processor 320 (FIGS. 3 and 4). The reference pixel and locations corresponding thereto are, for example, stored to memory, e.g., stored to registration data 420 (FIG. 4) by processor 320 (FIGS. 3 and 4).

In certain embodiments of step 730, locations corresponding to the reference pixel are found by searching scan lines in the non-reference images. Consider an exemplary image pair, including the reference image and a non-reference image, captured by two cameras located at the same vertical position. Bayer type camera 211 and camera 212 of camera array 210 in FIG. 2 illustrates such a scenario. In an example where Bayer type camera 211 and camera 212 have identical imaging properties, parallel optical axes, and coplanar pixel arrays, an object imaged onto the reference pixel selected in step 720 is located at the same vertical position in the non-reference image. A horizontal line at this vertical position is scanned in the non-reference image and the best match, along the horizontal scan line, to the content in the reference pixel is identified. In a more complex example where Bayer type camera 211 and camera 212 have, for example, different imaging properties (e.g., magnification), non-parallel optical axes, or non-coplanar pixel arrays, or are located at different vertical positions, the images are rectified to compensate therefore. Such rectification may include mapping the content of the image captured by camera 212 onto a new image using a transform that accounts for differences between Bayer type camera 211 and camera 212, other than the vantage point difference. Alternatively, differences are accounted for by scanning a transformed trajectory in the non-reference image. Transformation information may be stored in memory, e.g., calibration data 430 (FIG. 4), and retrieved when needed by, e.g., processor 320 (FIGS. 3 and 4).

In a step 740, the reference pixel selected in step 720 and the at least two locations, corresponding to the reference pixel, identified in step 730 are expressed in terms of reference pixel coordinates and stereo disparities. At least two stereo disparities $\Delta x(i)$ enter the problem.

Figure 8:
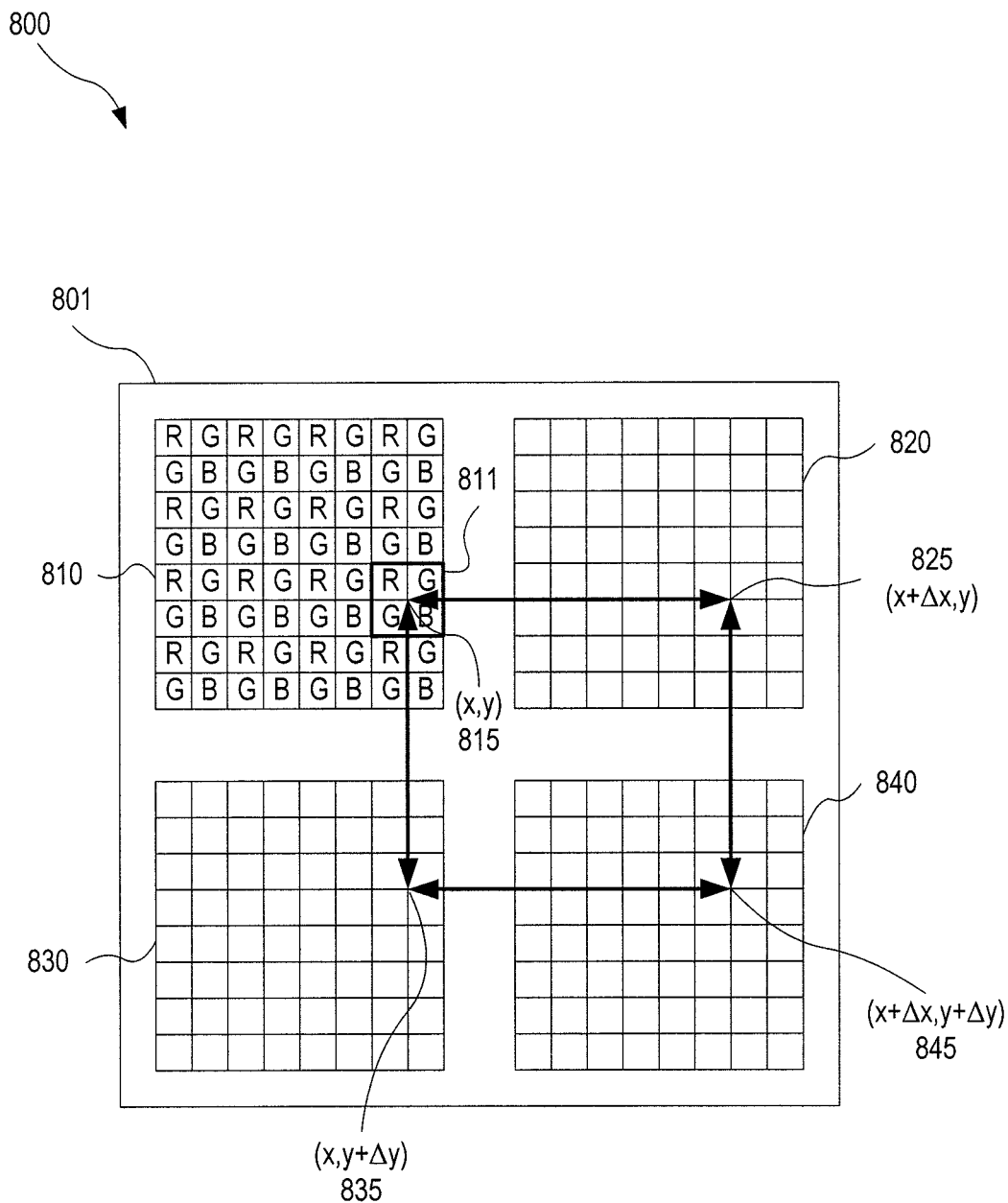
FIG. 8 is a schematic illustrating the correspondence between stereo disparities of a scene object as determined from images captured by one exemplary two-by-two camera array including at least one Bayer type camera, according to an embodiment.

This is illustrated in schematic 800 of FIG. 8 for one exemplary camera array 801. Camera array 801 includes a camera with a Bayer type pixel array 810, and three other cameras with pixel arrays 820, 830, and 840. The four cameras are arranged in a two-by-two grid. Color pixel 811 of Bayer type pixel array 810 defines an exemplary reference pixel, as selected in step 720 of FIG. 7, associated with a scene object in the image formed on Bayer type pixel array 810. The location 815 of reference pixel 811 is (x, y) (labeled 815 in FIG. 8) relative to a defined coordinate system origin, for example the upper left hand color pixel of Bayer type pixel array 810. In this example, corresponding locations 825, 835, and 845 are found in each of the images formed on respective pixel arrays 820, 830, and 840, according to step 730 of FIG. 7. The coordinates of location 825 of pixel array 820 is (x+$\Delta$x, y), where $\Delta$x is the stereo disparity associated with reference pixel location 815 and corresponding location 825. Analogously, location 835 in the image formed on pixel array 830 is (x, y+$\Delta$y). Finally, location 845 in the image formed on pixel array 840 is (x+$\Delta$x, y+$\Delta$y). This coordinate is found either by adding stereo disparity $\Delta$x to the coordinates of corresponding location 835 or by adding stereo disparity $\Delta$y to the coordinates of corresponding location 845.

Accordingly, all of locations 825, 835, and 845 are expressed in terms of the reference pixel location 815 and stereo disparities $\Delta$x and $\Delta$y. This leads to the following system of equations:

$$(x_{815}, y_{815}) = (x, y), \qquad \text{(Eq. 2a)}$$

$$(x_{825}, y_{825}) = (x+\Delta x, y), \qquad \text{(Eq. 2b)}$$

$$(x_{835}, y_{835}) = (x, y+\Delta y), \text{ and} \qquad \text{(Eq. 2c)}$$

$$(x_{815}, y_{815}) = (x+\Delta x, y+\Delta y). \qquad \text{(Eq. 2d)}$$

All of coordinates $x_{815}$, $y_{815}$, $x_{825}$, $y_{825}$, $x_{835}$, $y_{835}$, $x_{845}$, and $y_{845}$ are known, as they are extracted from the input images. Eq. 2a may be used to eliminate unknowns x and y, leaving three equations:

$$(x_{825}, y_{825}) = (x_{815}+\Delta x, y_{815}), \qquad \text{(Eq. 3a)}$$

$$(x_{835}, y_{835}) = (x_{815}, y_{815}+\Delta y), \text{ and} \qquad \text{(Eq. 3b)}$$

$$(x_{815}, y_{815}) = (x_{815}+\Delta x, y_{815}+\Delta y). \qquad \text{(Eq. 3c)}$$

Accordingly, the unknown quantities are stereo disparities $\Delta$x and $\Delta$y.

Returning to step 740 of method 700 (FIG. 7), the example illustrated in FIG. 8 is readily extended to any number of locations, corresponding to the reference pixel, in input images obtained from a general camera array, such as those discussed in connection with FIG. 2. Step 740 may constitute a portion of registration algorithm 412 (FIG. 4) and be executed by processor 320 (FIGS. 3 and 4).

In a step 750, pre-calibrated relationships between stereo disparities $\Delta x(i)$ are invoked to express all locations, corresponding to the reference pixel, in terms of the reference pixel location and a single stereo disparity. For example, these pre-calibrated relationships are retrieved from calibration data 430 as disparity relations 432. Denoting the single stereo disparity $\Delta$x, all other stereo disparities $\Delta x(i)$ may be expressed as $\Delta x(i) = f_i(\Delta x)$, where $f_i$ is a pre-calibrated function of $\Delta$x. $f_i$ is, for example, a linear function of $\Delta$x.

For illustration, step 750 is applied to the system of equations listed in Eq. 3 and relating to the example of FIG. 8, yielding the following system of equations:

$$(x_{825}, y_{825}) = (x_{815} + \Delta x, y_{815}), \quad \text{(Eq. 4a)}$$

$$(x_{835}, y_{835}) = (x_{815}, y_{815} + f(\Delta x)), \quad \text{and (Eq. 4b)}$$

$$(x_{815}, y_{815}) = (x_{815} + \Delta x, y_{815} + f(\Delta x)). \quad \text{(Eq. 4c)}$$

where $\Delta y = f(x)$. This leaves a system of three equations with a single unknown, stereo disparity $\Delta x$.

Step 750 may be applied to input images captured by any camera array, including a Bayer type camera, such as those discussed in connection with FIG. 2. In the general case, the output of step 750 is a system of at least two equations with a single unknown, i.e., an overdetermined system of equations. Step 750 constitutes, for example, a portion of registration algorithm 412 (FIG. 4) and is executed by, e.g., processor 320 (FIGS. 3 and 4).

In a step 760, the overdetermined system of equations generated in step 750, e.g., Eq. 4, is solved to determine the single stereo disparity $\Delta x$. Methods for solving overdetermined equation systems are known in the art. In some cases, an exact solution may be found using, for example, matrix algebra. Generally, an at least approximate solution may be found using an optimization method. In an embodiment, the overdetermined system of equations is solved using the method of least squares. Step 760 is, for example, a portion of registration algorithm 412 (FIG. 4) and may be executed by processor 320 (FIGS. 3 and 4). In a step 770, the determined stereo disparity $\Delta x$ is outputted to memory, to a user, or to an external computer. Step 770 is, for example, executed by processor 320 (FIGS. 3 and 4), which stores stereo disparity $\Delta x$ to stereo disparities 422 (FIG. 4), and/or communicates stereo disparity $\Delta x$ to a user or an external computer via interface 360 (FIGS. 3 and 4).

An optional step 780, calculates the depth of the scene object (or point) imaged onto the reference pixel selected in step 720, using Eq. 1. Optional step 780 is, for example, executed by processor 320 (FIGS. 3 and 4) and constitutes a portion of depth algorithm 416 (FIG. 4). The value of stereo baseline B may be retrieved from calibration data 430 (FIG. 4). Optional step 785 outputs the depth determined in step 780, for example to memory, a user, or an external computer. Optional step 785 may be executed by processor 320 (FIGS. 3 and 4), which stores the depth to results 450 (FIG. 4) and/or outputs the depth to a user or an external computer via interface 360 (FIGS. 3 and 4).

Figure 9:
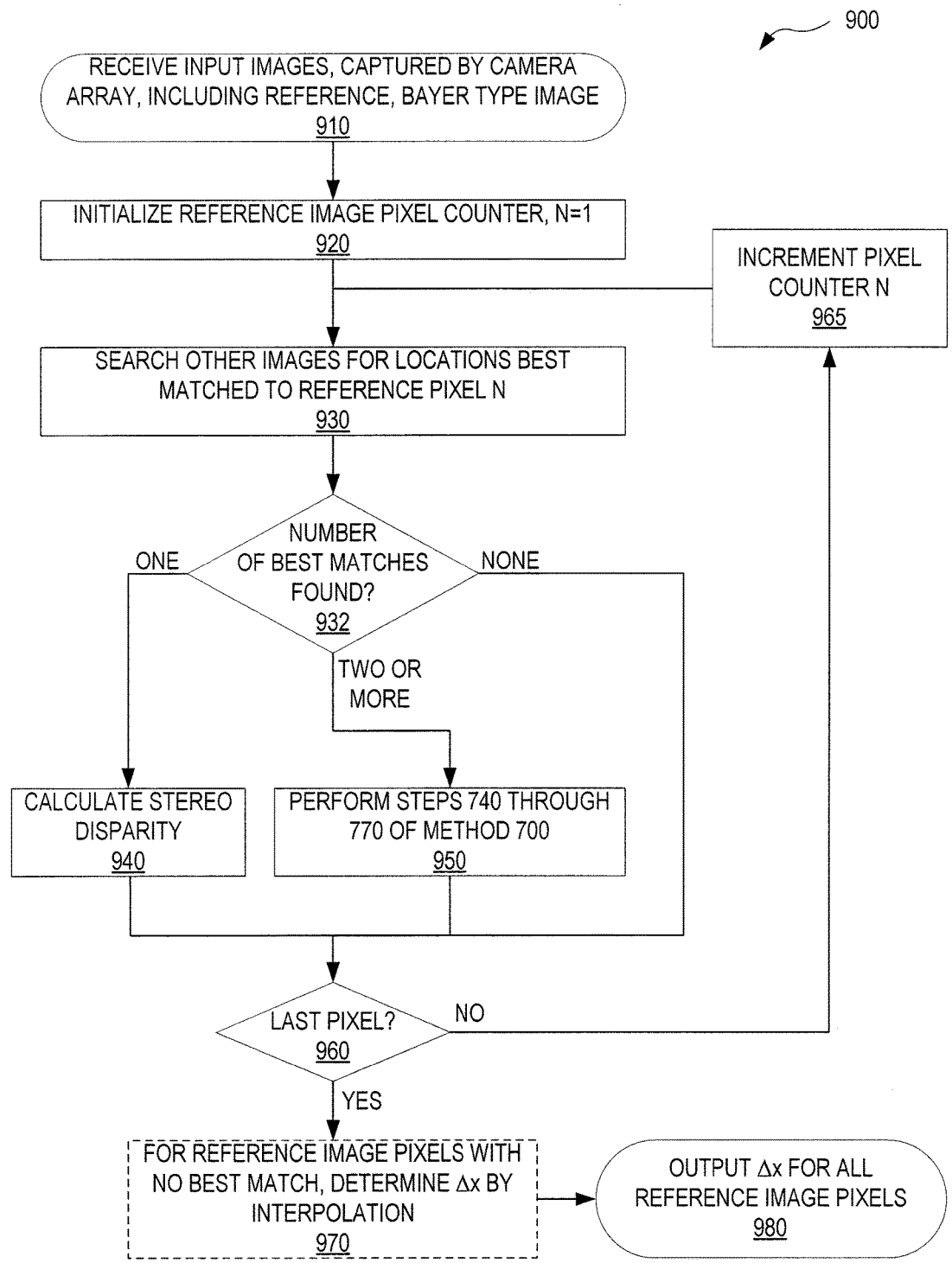
FIG. 9 illustrates one exemplary method for registration of a plurality of input images including a reference, Bayer type image, where the images are captured by a camera array and the registration results are provided in the form of a single stereo disparity for each pixel in the reference, Bayer type image, according to an embodiment.

FIG. 9 illustrates a method 900 for registering a plurality of input images, including at least one Bayer type image, captured by a camera array. One of the at least one Bayer type image defines a reference image and non-reference images are registered to the Bayer type reference image. Method 900 is one exemplary embodiment of step 540 of method 500 (FIG. 5) and the instructions of method 900 may be stored in registration algorithm 412 of FIG. 4. In method 900, the registration is expressed in terms of stereo disparities. In an alternative embodiment, not illustrated in FIG. 9, the registration determined by method 900 is expressed in terms of sets of corresponding locations.

In a step 910, input images generated by a camera array are received. The input images include a reference, Bayer type image. Step 910 is, for example executed by processor 320 (FIGS. 3 and 4), which may receive the input images from camera array 210 (FIGS. 2, 3, and 4) or, as needed, from a stored location such as image storage 350 (FIGS. 3 and 4). In a step 920, a reference image pixel counter is initialized. Reference image pixel counter is, for example, initialized by processor 320 (FIGS. 3 and 4) and stored in counter module 440 (FIG. 4). Subsequent steps 930 through 960 are performed for reference pixel N, where N is the value of the reference image pixel counter.

In a step 930, non-reference input images are searched for locations that match, or are the best match to, the content of reference pixel N. Step 930 utilizes the same search methods as step 730 of method 700 (FIG. 7). In some situations, no corresponding best match locations are found. This happens, for example, when a scene object, located close to the camera array used to capture the input images, occludes the content of reference pixel N in the non-reference images. Other scenarios that may result in no corresponding best match locations include those where the search method failed to find a single best match location. For example, the search may find two best match locations with no information to guide a choice between the two, or the content of reference pixel N may be a part of a larger uniform area in the image such that the search identifies a larger range rather than a single location. Step 930 is, for example, executed by processor 320 (FIGS. 3 and 4). The location of reference pixel N and corresponding best matches may be stored to memory, e.g., stored to registration data 420 (FIG. 4) by processor 320 (FIGS. 3 and 4).

Step 932 is a decision. Step 932 evaluates the number of corresponding best match locations found in step 930. Step 932 is, for example, executed by processor 320 (FIGS. 3 and 4), optionally based on a retrieval of corresponding best match locations from registration data 420. If no corresponding best match locations were found in step 930, method 900 proceeds to a step 960. If a single corresponding best match location was found in step 930, method 900 proceeds to a step 940, wherein the stereo disparity associated with reference pixel N is calculated from the difference between the location of reference pixel N and the corresponding best match. Step 950 may be executed by processor 320 (FIGS. 3 and 4). If two or more corresponding best match locations were found in step 930, method 900 proceeds to a step 950, which is identical to steps 740 through 770 of method 700 (FIG. 7), and determines a stereo disparity associated with reference pixel N. Stereo disparities determined in steps 940 and 950 may be stored to memory. For example, processor 320 (FIGS. 3 and 4) stores determined stereo disparities to registration data 420 (FIG. 4).

Step 960 is another decision. Step 960 may be executed by processor 320 (FIGS. 3 and 4). If reference pixel N is not the last pixel of the reference, Bayer type image, method 900 proceeds to a step 965, wherein the reference image pixel counter is incremented before method 900 proceeds to step 930. Step 965 is, for example, executed by processor 320 (FIGS. 3 and 4) by reading the value of the reference image pixel counter from counter module 440 (FIG. 4), incrementing the value, and storing the incremented value to counter module 440. If reference pixel 960 is the last pixel of the reference, Bayer type image, method 900 proceeds to an optional step 970. Optional step 970 determines a stereo disparity for each of the reference pixels where no corresponding best match location was found in step 930. For these pixels, a stereo disparity is determined by interpolation from other reference pixels with known stereo disparity. Optional step 970 is, for example, executed by processor 320 (FIGS. 3 and 4) using stereo disparities stored in registration data 420 (FIG. 4). In a step 980, method 900 outputs stereo disparities. Step 980 may be executed by processor 320 (FIGS. 3 and 4), which stores the stereo disparities to registration data 420 (FIG. 4) and/or outputs the depth to a user or an external computer via interface 360 (FIGS. 3 and 4).

Figure 10:
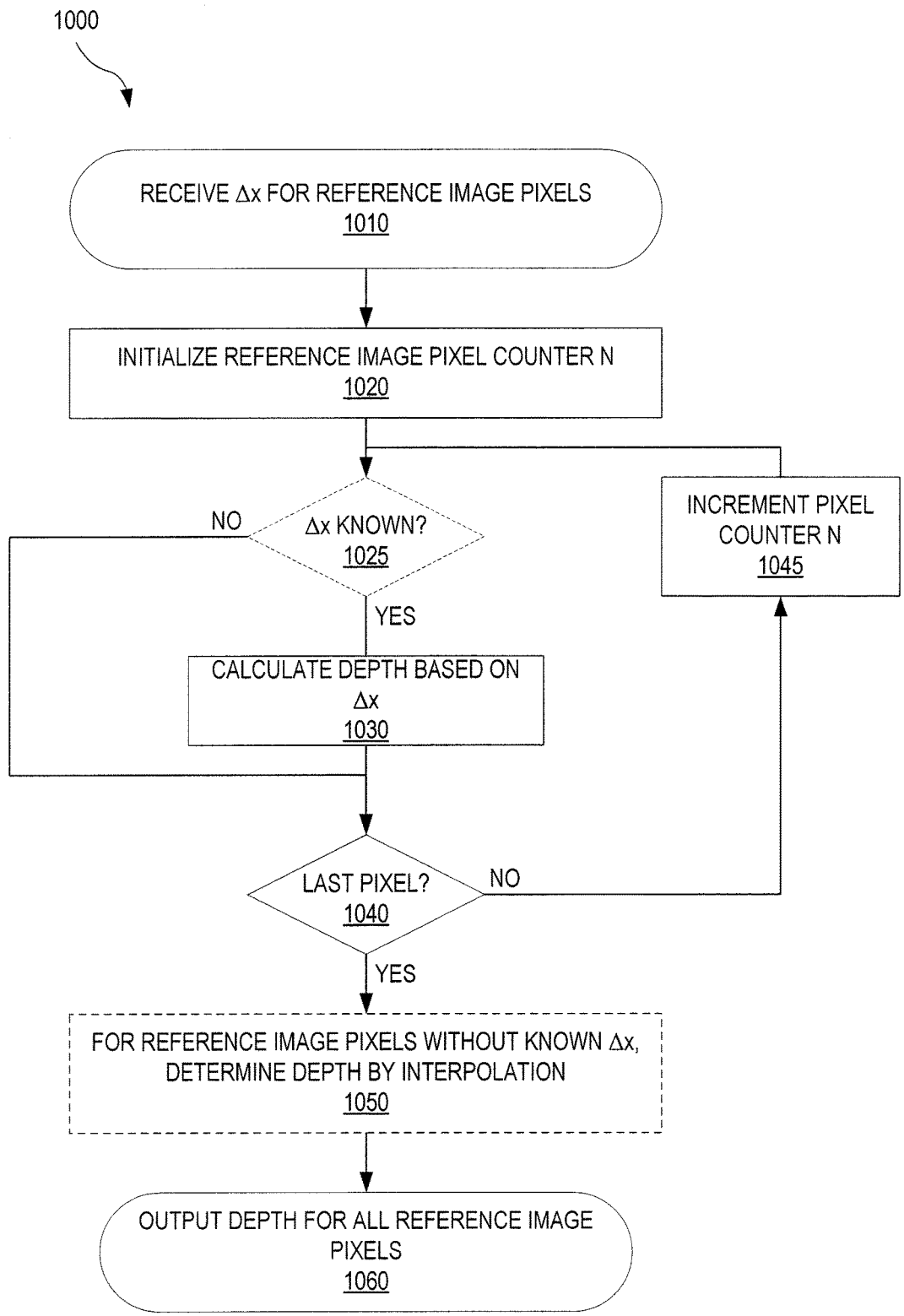
FIG. 10 illustrates one exemplary method for generating a depth map based on a plurality of input images, including at least one reference, Bayer type image, wherein the depth map is registered to the reference, Bayer type image, according to an embodiment.

FIG. 10 illustrates a method 1000 for generating a depth map based on a plurality of input images, including at least one reference, Bayer type image. Method 1000 is one exemplary embodiment of step 550 of method 500 (FIG. 5). The instructions of method 1000 may be implemented into system 400 (FIG. 4) as depth algorithm 416. Method 1000 generates a depth map by using registration data, i.e., pixel correspondences between the input images, expressed relative to the reference, Bayer type image. In this embodiment, the registration data used by method 1000 is in the form of stereo disparities. In an alternative embodiment, not illustrated in FIG. 10, the input to method 1000 is sets of corresponding pixels, which are translated into stereo disparities by method 1000.

In a step 1010, method 1000 receives stereo disparities associated with the pixels of the reference, Bayer type image. Step 1010 is, for example, executed by processor 320 (FIGS. 3 and 4) which retrieves stereo disparities 422 (FIG. 4) from registration data 420 (FIG. 4). In a step 1020, a reference image pixel counter N is initialized. Reference image pixel counter is, for example, initialized by processor 320 (FIGS. 3 and 4) and stored in counter module 440 (FIG. 4). Subsequent steps 1025 through 1045 are performed for reference pixel N.

Optional step 1025 evaluates if the stereo disparity associated with reference pixel N is known. Optional step 1025 is included in method 1000 in situations where the registration data associated with the reference, Bayer type image is incomplete, e.g., if the registration data is generated by method 900 (FIG. 9) without performing optional step 970. Step 1025 is, for example, executed by processor 320 (FIGS. 3 and 4) by performing a search on stereo disparities 422 (FIG. 4). If the stereo disparity associated with reference pixel N is not known, method 1000 proceeds to a step 1040. If the stereo disparity associated with reference pixel N is known, method 1000 proceeds to a step 1030. In step 1030, the depth associated with reference pixel N is calculated from the stereo disparity using Eq. 1. Step 1030 is, for example, executed by processor 320 (FIGS. 3 and 4) and the resulting depth stored to results 450 (FIG. 4). Step 1040 is a decision. If reference pixel N is the last reference pixel, method 1000 proceeds to an optional step 1050. Otherwise, method 1000 proceeds to a step 1045. Step 1040 may be executed by processor 320 (FIGS. 3 and 4). Step 1045 increments image pixel counter N before method 1000 proceeds to step 1025. Step 1045 is, for example, executed by processor 320 (FIGS. 3 and 4) by reading the value of the reference image pixel counter from counter module 440 (FIG. 4), incrementing the value, and storing the incremented value to counter module 440.

Optional step 1050 is invoked if the registration data input to method 1000 is incomplete, as discussed for optional step 1025. In optional step 1050, the depth associated with reference pixels, for which the stereo disparity is unknown, is determined by interpolation from other reference pixels with known associated depth. Optional step 1050 is, for example, executed by processor 320 (FIGS. 3 and 4) using depths stored in results 450 (FIG. 4). In a step 1060, the depth associated with each of the pixels in the reference, Bayer type image is outputted. In an embodiment, the output is in the form of a depth map registered to the reference Bayer type image. Step 1060 is, for example, executed by processor 320 (FIGS. 3 and 4), which stores the depth map to results 450 (FIG. 4) and/or outputs the depth map to a user or an external computer via interface 360 (FIGS. 3 and 4).

Figure 11:
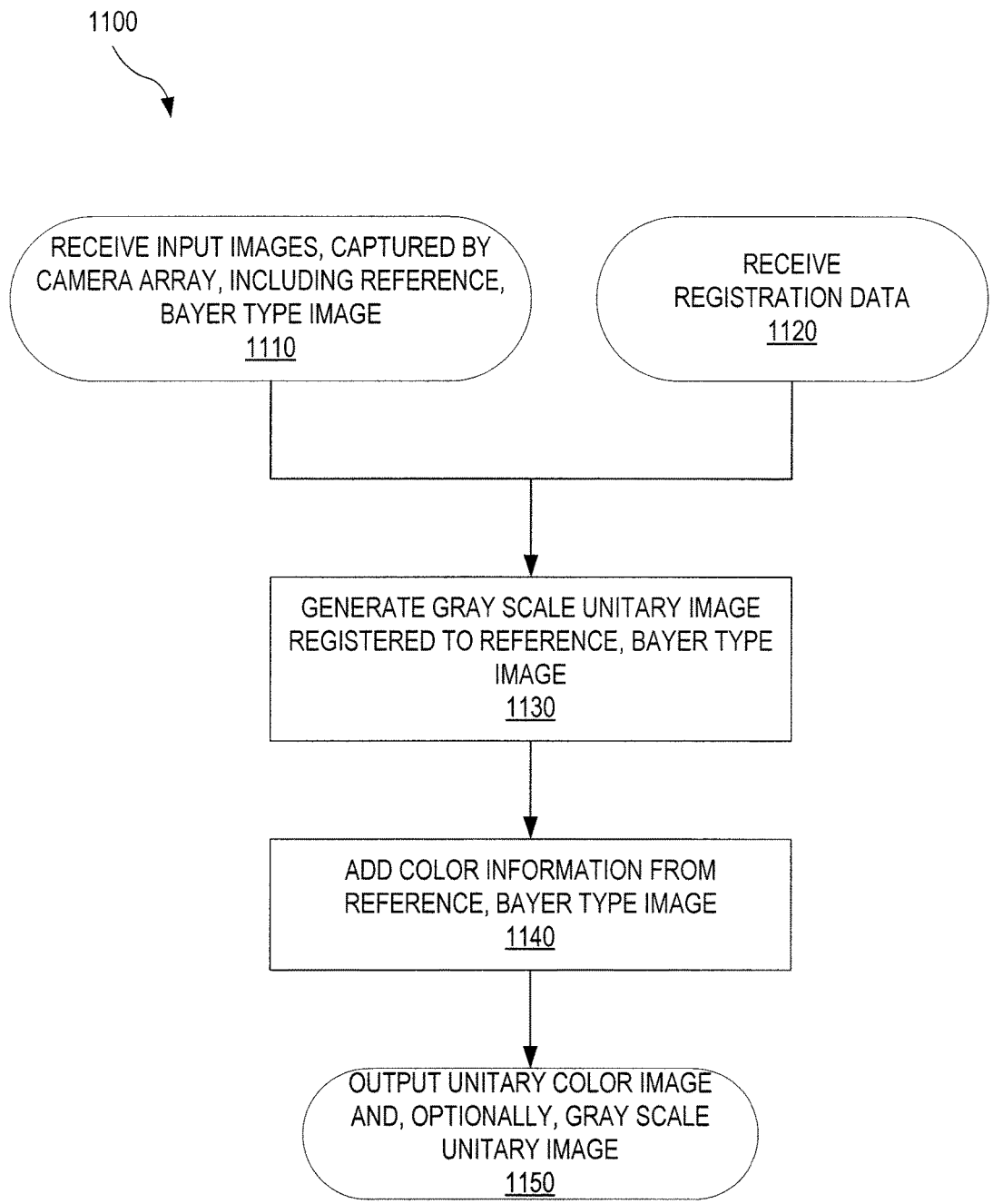
FIG. 11 illustrates one exemplary method for generating a unitary color image from a plurality of input images including a reference, Bayer type image, wherein the unitary color image is registered to the reference, Bayer type image and the color of the unitary color image is obtained from the reference, Bayer type image, according to an embodiment.

FIG. 11 illustrates a method 1100 for generating a unitary color image from a plurality of input images, including a reference, Bayer type image, captured by a camera array. Method 1100 is an embodiment of step 560 of method 500 (FIG. 5). The instructions of method 1000 may be implemented into system 400 (FIG. 4) as combination algorithm 414. Embodiments of method 1100, specifically tailored to certain types of input images, are disclosed in FIGS. 14 and 16.

In a step 1110, method 1100 receives input images, including a reference, Bayer type image, captured by a camera array. Step 1110 may be executed by processor 320 (FIGS. 3 and 4), which may retrieve the input images from image storage 350 (FIGS. 3 and 4). In a step 1120, method 1100 receives input registration data. In an example of step 1120, processor 320 (FIGS. 3 and 4) retrieves registration data 420 (FIG. 4).

In a step 1130, a gray scale unitary image is generated. Step 1130 may be executed by processor 320 (FIGS. 3 and 4). Each pixel of the gray scale unitary image has a pixel intensity but no color definition. The unitary image is registered to the reference, Bayer type input image, i.e., the location of a scene object in the unitary image at least approximately equals that in the reference, Bayer type image. Small shifts may occur due to, for example, improved spatial resolution resulting from the image combination process.

In an embodiment, the gray scale information is obtained from combining pixel intensities from all input images, using the registration data. The combination process for a given pixel in the reference, Bayer type image may be performed by combination of a plurality of pixel intensities, each extracted from a single pixel in a respective input image. Alternatively, the combination process may be performed at super-pixel resolution, if the registration data is provided at super-pixel resolution. In this case, the pixel intensity extracted from an individual input image may be a weighted average of multiple pixel intensities, e.g., the intensities of pixels closest to the location defined by the registration data. In certain embodiments, gray scale information is determined based only upon non-Bayer type images, i.e., images captured by cameras where all pixels are of the same color sensitivity. As discussed in the following, non-Bayer type image sensors often provide higher quality gray scale information than Bayer type image sensors.

Figure 12:
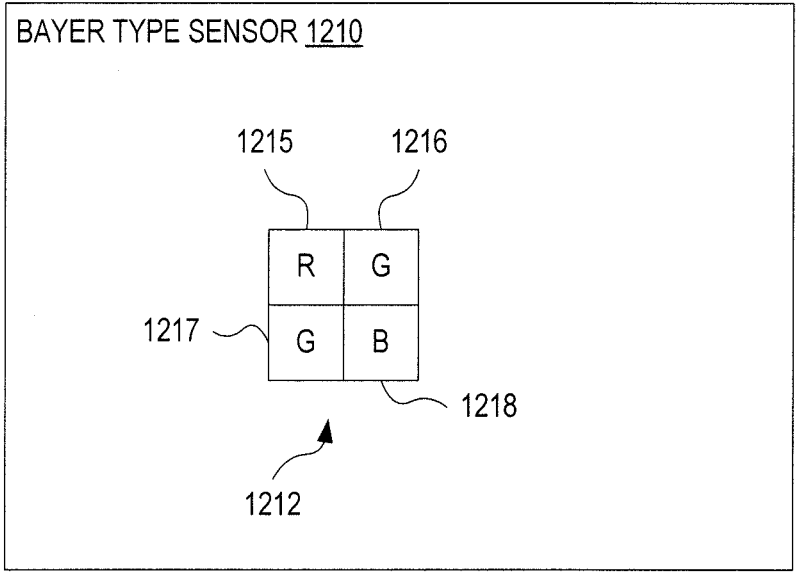
FIG. 12 is a schematic illustrating a comparison of one exemplary Bayer type image sensor 1210 and one exemplary non-Bayer type image sensor 1220 based on the same underlying pixel array, according to an embodiment.
Figure 12:
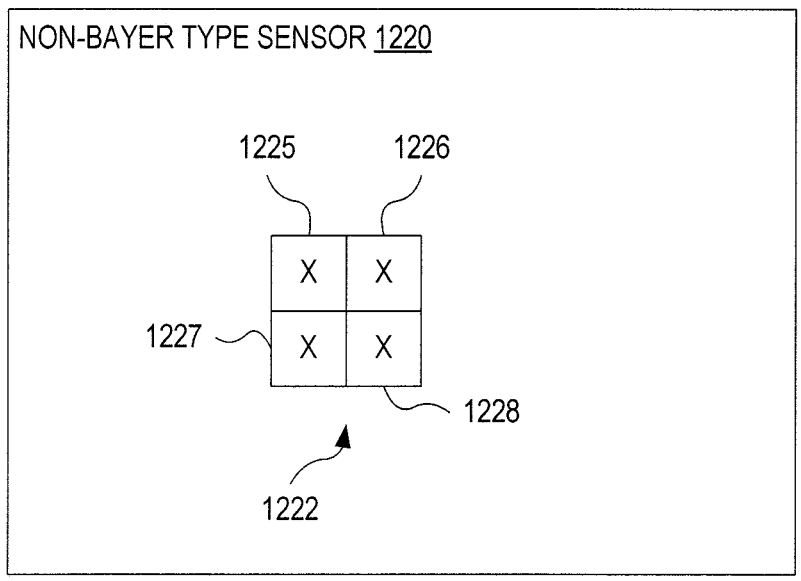

FIG. 12 is a comparison of a Bayer type image sensor 1210 and a non-Bayer type image sensor 1220 based on the same underlying pixel array. As discussed in connection with FIG. 1, the Bayer type image sensor is composed of color pixels. One exemplary color pixel 1212 is indicated in FIG. 12. Color pixel 1212 is composed of photosites 1215 sensitive to red light, 1216 and 1217 sensitive to green light, and 1218 sensitive to blue light. These photosites are actual sensor pixels coated with a spectrally selective coating. The signals from each of photosites 1215, 1216, 1217, and 1218 are analyzed to provide both a gray scale value and color definition of color pixel 1212. Photosites 1215, 1216, 1217, and 1218 correspond to pixels 1225, 1226, 1227, and 1228 of non-Bayer type image sensor 1220. Hence, images generated by non-Bayer type image sensor 1220 have four times the pixel resolution as compared to images generated by Bayer type image sensor 1210 and therefore provide gray scale information at higher resolution. The spectrally selective coatings of photosites 1215, 1216, 1217, and 1218 further affect the quality of grayscale information obtained from a Bayer type image sensor. Each of the spectrally selective coatings of photosites 1215, 1216, 1217, and 1218 prevents light of wavelengths outside a respective passband from reaching the photoactive area of the sensor. The passband defines the spectral range detected by the photosite. Furthermore, even within the passband, the transmission of the coating is typically in the range 60-90%. The light losses imposed by the spectrally selective coatings result in decreased signal-to-noise ratio for Bayer type image sensor 1210 as compared to non-Bayer type image sensor 1220. Accordingly, gray scale information of improved spatial resolution and signal-to-noise ratio may be obtained by determining the gray scale information based only upon non-Bayer type images.

In a step 1140, the color information is added to the gray scale unitary image generated in step 1130. The color information is extracted from the reference, Bayer type image. Step 1140 is, for example, executed by processor 320 (FIGS. 3 and 4). Each pixel of the unitary image is assigned a color. The assigned color is that of the corresponding pixel in the reference, Bayer type image. The reference, Bayer type image has complete color information and the color information of the unitary image is therefore free of certain color artifacts, such as occlusion-induced color aliasing, experienced with prior art systems that obtain color information for a unitary image from an image combination process.

In one embodiment, the unitary image and the reference, Bayer type image are of identical pixel resolution. The color of a given pixel in the unitary image is that of the corresponding pixel in the reference, Bayer type image. In another embodiment, the unitary image is of higher pixel resolution than the reference, Bayer type image, such that each pixel in the reference, Bayer type image corresponds to a block of multiple pixels in the unitary image. This may be the case if, for example, grayscale information is obtained only from non-Bayer type images based on the same underlying pixel array as the reference, Bayer type image sensor (see FIG. 12). Each pixel in the block of pixels in the unitary image is assigned the color of the reference pixel corresponding to the block of pixels. This results in a unitary color image with gray scale information of higher spatial resolution than the color information. In many applications, this is fully acceptable as, generally, the human vision is more sensitive to gray scale spatial detail than color spatial detail. In yet another embodiment, the unitary gray scale image generated in step 1130 is of an arbitrary pixel resolution different from that of the reference, Bayer type image Each pixel of the unitary gray scale image is assigned a color that is either (a) the color of the reference pixel that is the closest match in terms of pixel location or (b) a weighted average of a set of reference pixel that are the closest match in terms of pixel location.

In a step 1150, the unitary color image finalized in step 1140 is outputted. In certain embodiments, the output of step 1150 further includes the gray scale unitary image generated in step 1130. Step 1150 is, for example, executed by processor 320 (FIGS. 3 and 4), which stores the unitary color image, and optionally the gray scale unitary image, to results 450 (FIG. 4) and/or outputs the unitary color image, and optionally the gray scale unitary image, to a user or an external computer via interface 360 (FIGS. 3 and 4). The steps of method 1100 may be reorganized, without departing from the scope hereof. In one embodiment, step 1140 is performed before step 1130. In another embodiment, steps 1130 and 1140 are performed in parallel. In yet another embodiment, the unitary color image is generated pixel by pixel, by performing steps 1130 and 1140 for a single pixel of the unitary image and repeating these two steps for all pixels.

Figure 13:
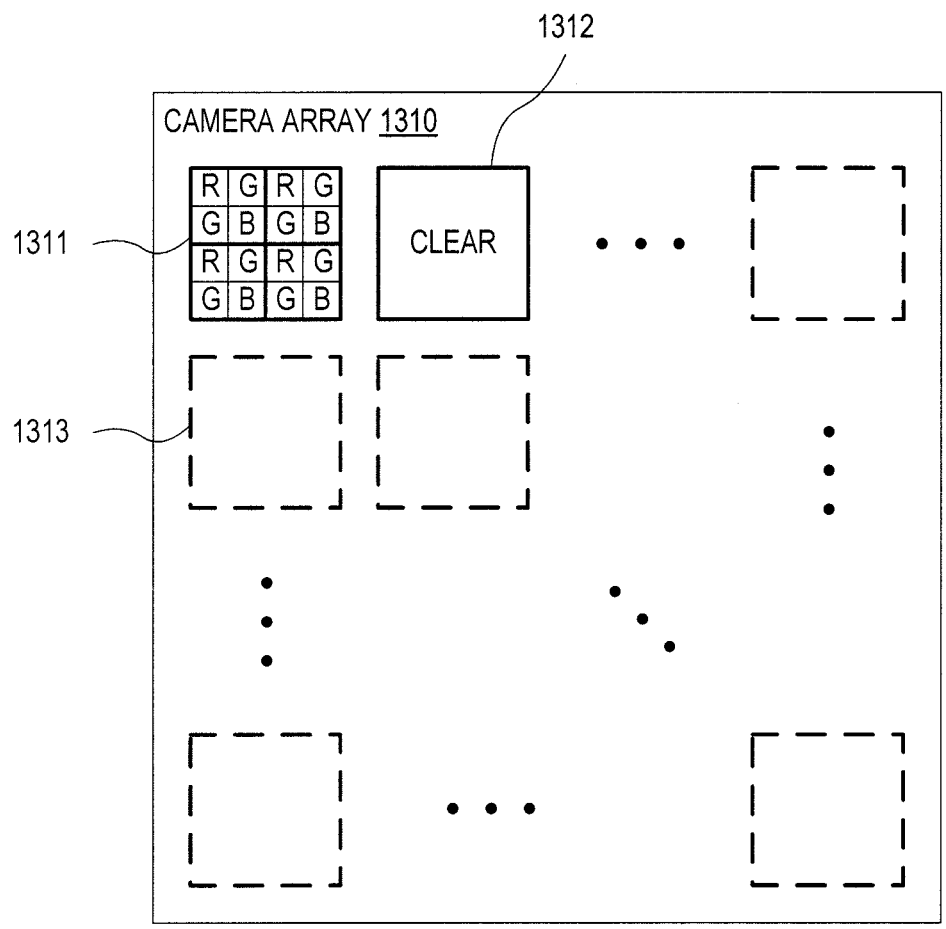
FIG. 13 illustrates one exemplary embodiment of the camera array of FIG. 2, wherein the camera array includes a Bayer type camera, at least one clear camera, and additional optional cameras.

FIG. 13 illustrates a camera array 1310 that is an embodiment of camera array 210 (FIGS. 2, 3, and 4). Camera array 1310 includes a Bayer type camera 1311, a clear camera 1312, and any number of optional cameras 1313 (only one labeled in FIG. 13). Clear camera 1312 is sensitive to at least the spectral range covered by the Bayer type camera and provides gray-scale information only. In an embodiment, clear camera 1312 includes a monochrome image sensor for image capture.

Figure 14:
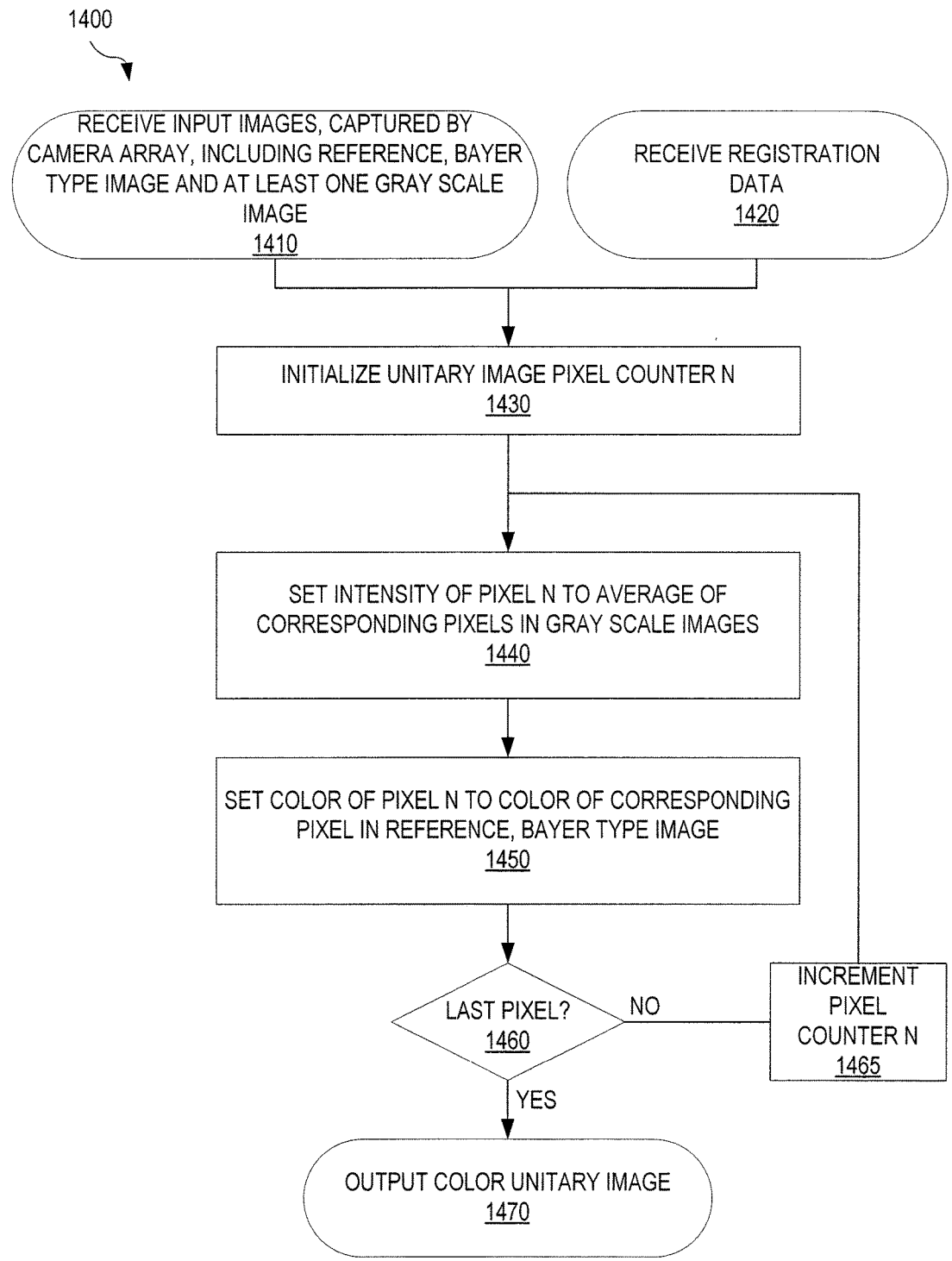
FIG. 14 illustrates an embodiment of the method of FIG. 11 tailored for processing of input images including a reference, Bayer type image and at least one clear image, the images being captured by a camera array such as that illustrated in FIG. 13.

FIG. 14 illustrates a method 1400 for generating a unitary color image from a plurality of input images, including a reference, Bayer type image and at least one gray scale image. The input images used by method 1400 are captured by a camera array, for example camera array 1310 of FIG. 13. Method 1400 is an embodiment of method 1100 (FIG. 11) tailored to take advantage of the specific types of input images.

Steps 1410 and 1420 are identical to respective steps 1110 and 1120 of method 1100 (FIG. 11), except for requiring that the input images received in step 1410 include a reference, Bayer type image and at least one gray scale image. It is assumed that each pixel of the at least one gray scale image corresponds spatially to a photosite of a color pixel of the reference, Bayer type image, as illustrated in FIG. 12. In a step 1430, a unitary image pixel counter N is initialized. The unitary image pixel counter is, for example, initialized by processor 320 (FIGS. 3 and 4) and stored in counter module 440 (FIG. 4). Subsequent steps 1440 through 1465 are performed for unitary pixel N, where N is the value of the unitary image pixel counter. In a step 1440, the intensity, i.e., gray scale value of unitary pixel N is set to an average of corresponding pixels in the gray scale input images. In some cases, there is only a single corresponding pixel in the gray scale input image and the average is simply the value of this single corresponding pixel. Step 1440 specifies an embodiment of step 1130 (FIG. 11) applied to a single pixel of the unitary image, in which the gray scale information of the gray scale unitary image is determined based only on gray scale input images. In a step 1450, the unitary pixel N is assigned the color of the corresponding color pixel in the reference, Bayer type image. Step 1450 specifies an embodiment of step 1140 of FIG. 11. In a step 1460, the value of unitary pixel counter N is evaluated. Step 1460 may be executed by processor 320 (FIGS. 3 and 4). If unitary pixel N is the last pixel of the unitary image, method 1400 proceeds to a step 1470. Otherwise, method 1400 proceeds to a step 1465, in which the unitary pixel counter N is incremented before proceeding to step 1440. Step 1465 is, for example, executed by processor 320 (FIGS. 3 and 4) by reading the value N of the unitary image pixel counter from counter module 440 (FIG. 4), incrementing the value, and storing the incremented value to counter module 440. Step 1470 is identical to step 1150 of method 1100 (FIG. 11).

Figure 15:
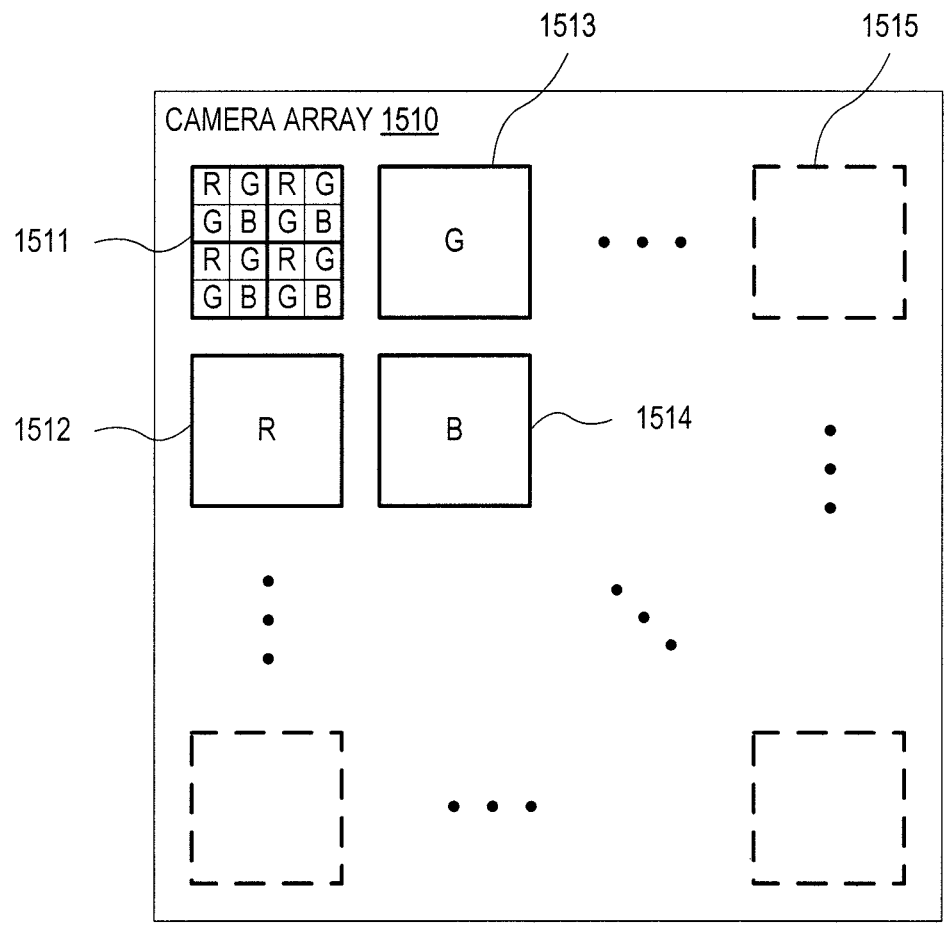
FIG. 15 illustrates one exemplary embodiment of the camera array of FIG. 2, wherein the camera array includes a Bayer type camera, and a set of cameras each sensitive to a portion of the spectral range covered by the Bayer type camera and in combination covering at least the spectral range covered by the Bayer type camera.

FIG. 15 illustrates a camera array 1510 that is an embodiment of camera array 210 (FIGS. 2, 3, and 4). Camera array 1510 includes a Bayer type camera 1511, an R-camera 1512 sensitive to red light, a G-camera 1513 sensitive to green light, a B-camera 1514 sensitive to blue light, and any number of optional cameras 1515 (only one labeled in FIG. 15). In an embodiment, each photosite of a color pixel of Bayer type camera 1511 has the same spectral selectivity as one of R-camera 1512, G-camera 1513, and B-camera 1514. While in FIG. 15, Bayer type camera 1511 is based on a conventional filter array with each color pixel composed of one red, two green, and one blue photosite, other Bayer type filter array may be used without departing from the scope hereof. Likewise, R-camera 1512, G-camera 1513, and B-camera 1514 may be substituted by another set of cameras, each sensitive to a certain spectral range and in combination covering at least the spectral range of Bayer type camera 1511, e.g., the visible range, without departing from the scope hereof.

Figure 16:
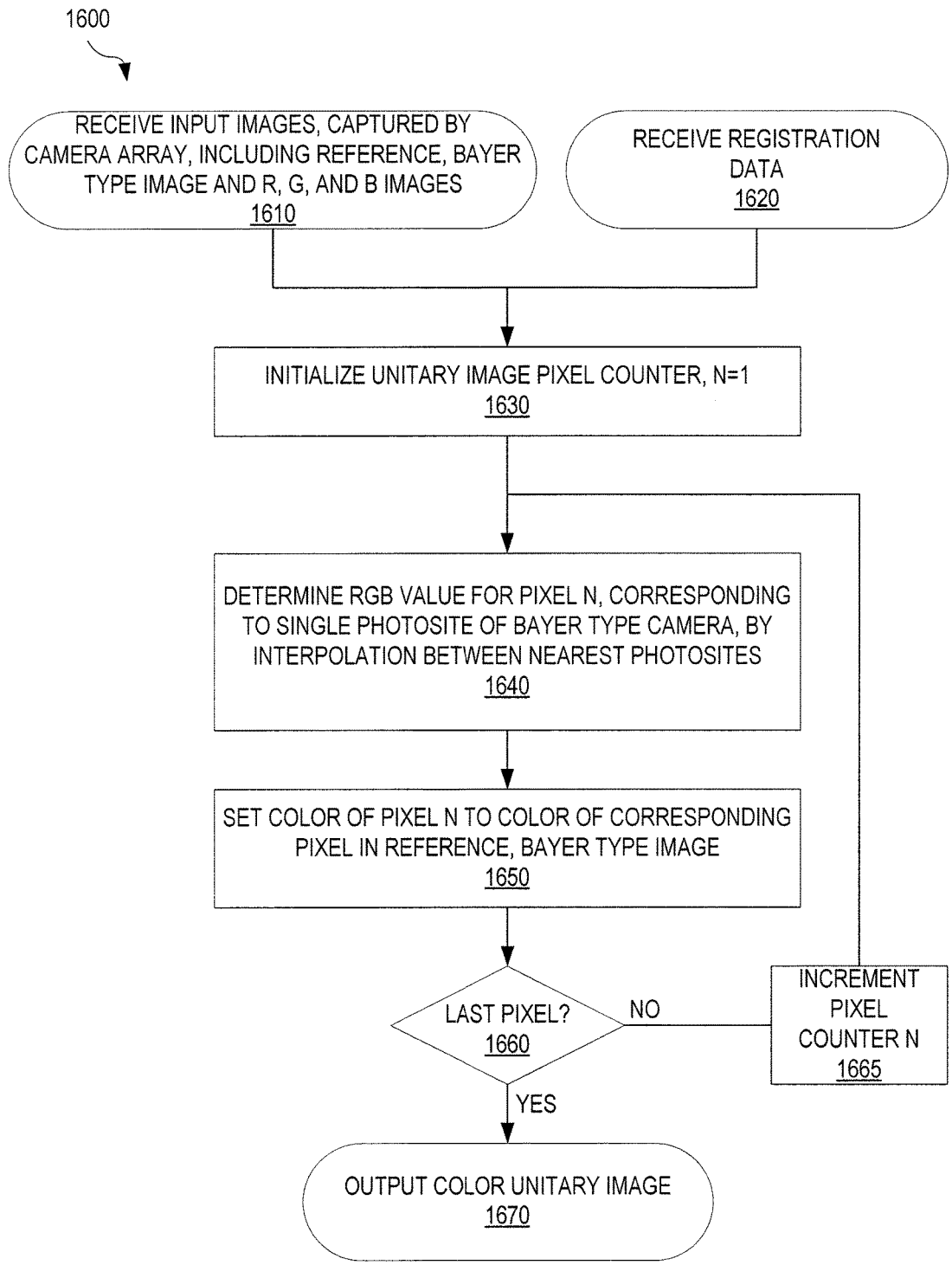
FIG. 16 illustrates an embodiment of the method of FIG. 11 tailored for processing of input images including a reference, Bayer type image, an image representative of red incoming light, an image representative of green incoming light, and an image representative of blue incoming light, the input images being captured by a camera array such as that illustrated in FIG. 14.

FIG. 16 illustrates a method 1600 for generating a unitary color image from a plurality of input images, including a reference, Bayer type image, and R, G, and B images, where the R, G, and B images are images of the red, green, and blue, portions, respectively, of the incoming light. The input images used by method 1600 are captured by a camera array, for example camera array 1510 of FIG. 15. R, G, and B images may be substituted by another set of images, each representative of a certain spectral range and in combination covering at least the spectral range of the reference, Bayer type image, without departing from the scope hereof. It is assumed that each pixel of the R, G, and B images corresponds spatially to a photosite of a color pixel of the reference, Bayer type image, as illustrated in FIG. 12. Method 1600 is an embodiment of method 1100 (FIG. 11) tailored to take advantage of the specific types of input images. Method 1600 is readily extended to any plurality of input images that include a reference, Bayer type image and a set of other images, where each of the other images represents a portion of the spectral range of the Bayer type image and in combination represents at least the spectral range of the Bayer type image.

Step 1610 is identical to step 1110 of method 1100 (FIG. 11), except that it is required that the input images received in step 1610 include a reference, Bayer type image and R, G, and G images. Steps 1620 and 1630 are identical to respective steps 1420 and 1430 of method 1400 (FIG. 14). Step 1640 specifies an embodiment of step 1130 of method 1100 (FIG. 11), applied to a single pixel of the unitary image, in which the intensity, i.e., gray scale value, of unitary pixel N is set to a weighted average of corresponding pixels in each of the R, G, and B input images. In combination, the R, G, and B pixels used in step 1640 provide a gray scale value at a pixel resolution greater than what is achievable by combining photo sites of a color pixel of the reference, Bayer type image. Steps 1650, 1660, 1665, and 1670 are identical to respective steps 1450, 1460, 1465, and 1470 of method 1400 (FIG. 14).

Figure 17:
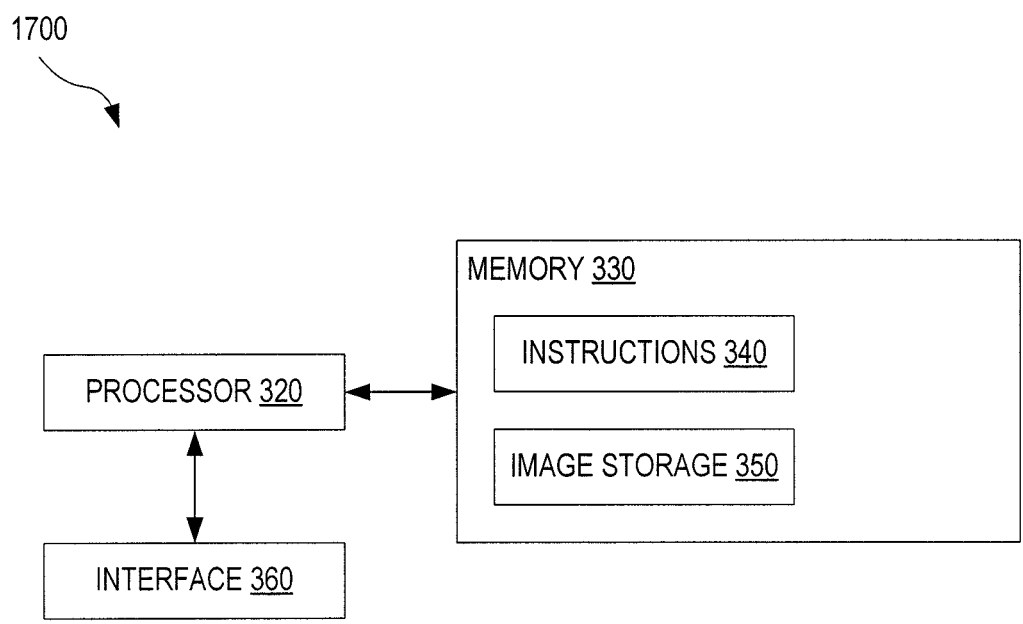
FIG. 17 illustrates one exemplary system for processing images, including at least one Bayer type image, according to an embodiment.

FIG. 17 illustrates a system 1700 for processing a plurality of input images, including at least one Bayer type image, captured by a camera array. System 1700 is an embodiment of image processing system 120 (FIG. 1). System 1700 includes processor 320 (FIGS. 3 and 4), memory 330 (FIGS. 3 and 4), and interface 360 (FIGS. 3 and 4). Processor 320 processes a plurality of images stored in image storage 350 (FIGS. 3 and 4) of memory 330 according to instructions 340 (FIGS. 3 and 4) to, e.g., generate unitary color image 130 (FIG. 1) and depth map 140 (FIG. 1). Results generated by processor 320 may be communicated to a user or an external computer via interface 360.

Figure 18:
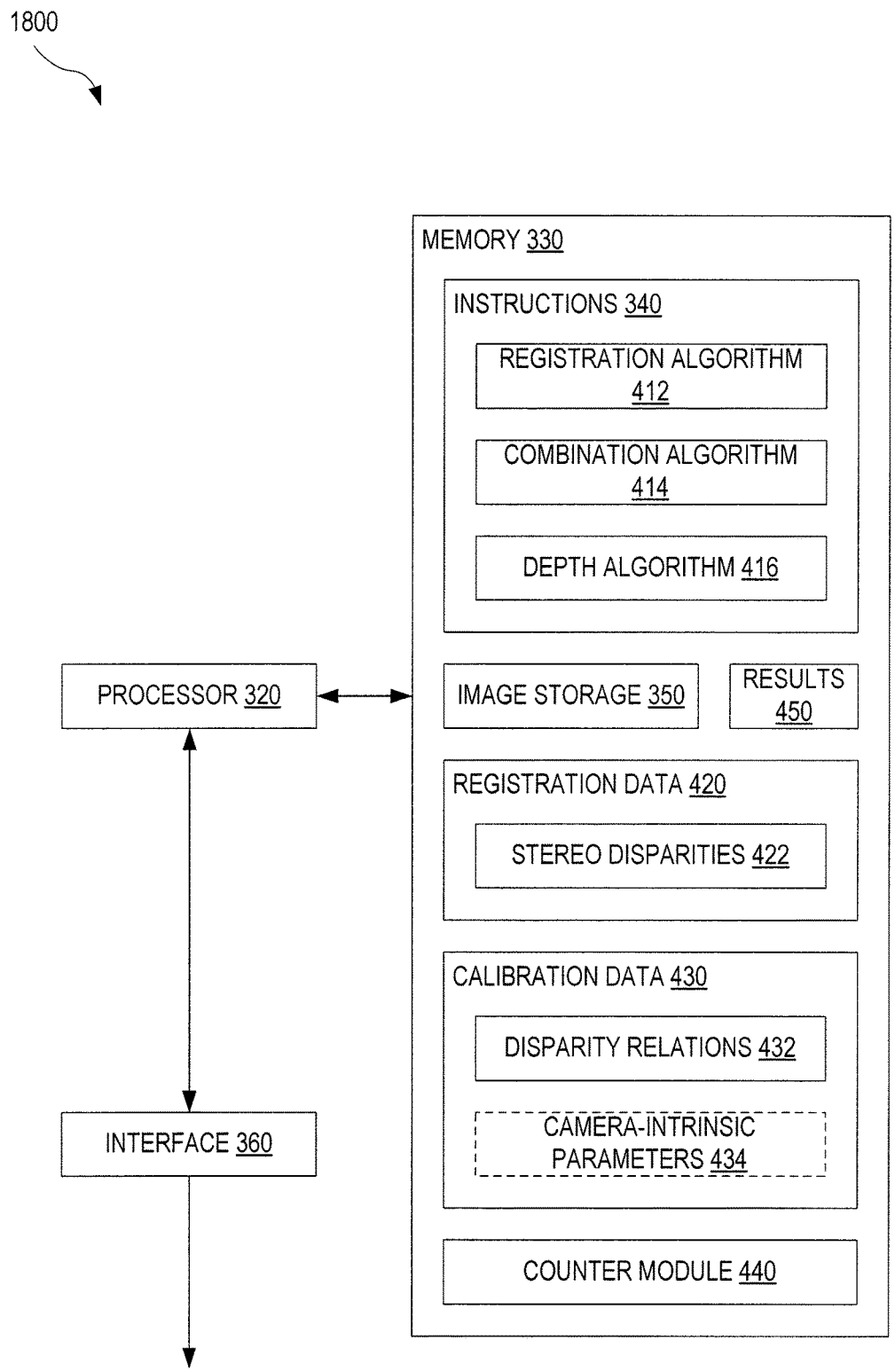
FIG. 18 illustrates one exemplary embodiment of the system of FIG. 17.

FIG. 18 illustrates a system 1800 which is an embodiment of system 1700. In system 1800, machine-readable instructions 340 includes algorithms for processing of a plurality of images of the same scene captured by camera array 210, each image representing a view of the scene from a different vantage point. The algorithms included in instructions 340 are: registration algorithm 412 for registration of the plurality of images; combination algorithm 414 for generating a unitary image, e.g., unitary color image 130 of FIG. 1, based on the plurality of images; and depth algorithm 416 for generating a depth map, e.g., depth map 140 of FIG. 1, based on the plurality of images. Memory 330 further includes registration data 420 for storing registration data generated by processor 320 according to instructions in registration algorithm 412. Registration data 420 includes stereo disparities 422. Memory 330 further includes calibration data 430 used by processor 320 in the processing of images received from camera array 210. Calibration data 430 includes disparity relations 432 that are used by processor 320 to execute registration algorithm 412. Further, memory 330 includes a counter module 440 used by processor 320 in the execution of instructions 340, and results 450 for storage of results generated by processor 320 according to instructions 340. System 1800 processes images stored in image storage 350 (FIGS. 3, 4, and 17), as opposed to processing images received directly from a camera array.

Combinations of Features

Features described above as well as those claimed below may be combined in various ways without departing from the scope hereof. For example, it will be appreciated that aspects of one camera array system or method described herein may incorporate or swap features of another camera array system or method described herein. The following examples illustrate possible, non-limiting combinations of embodiments described above. It should be clear that many other changes and modifications may be made to the methods and system herein without departing from the spirit and scope of this invention:

(A) A method for processing a plurality of images of a scene recorded from different vantage points, the plurality of images including a color reference image captured by a Bayer type camera and at least one additional image, the method including generating a unitary color image from the plurality of images, wherein color information of the unitary color image is determined exclusively from the color reference image.

(B) The method denoted as (A), further including registering at least a portion of the plurality of images.

(C) The method denoted as (B), wherein the step or registering includes, for each pixel in the color reference image, finding one or more corresponding locations in the at least one additional image, where each corresponding location belongs to a different one of the at least one additional image and represents the same portion of the scene as the pixel in the color reference image.

(D) The method denoted as (C), wherein the step of registering further includes determining a single stereo disparity, associated with the pixel in the color reference image, based on all of the one or more corresponding locations.

(E) The method denoted as (D), wherein the step of determining a single stereo disparity includes, when a pixel in the color reference image has a plurality of corresponding locations, calculating a plurality of stereo disparities, each being the shift of a respective one of the plurality of corresponding locations relative to the pixel in the color reference image.

(F) The method denoted as (E), wherein the step of determining a single stereo disparity further includes invoking one or more known relationships between the plurality of stereo disparities to eliminate all but the single stereo disparity.

(G) The method denoted as (F), wherein the step of determining a single stereo disparity further includes solving a system of equations, expressed by the single stereo disparity, known coordinates of the pixel in the color reference image, and known coordinates of all of the corresponding locations, to determine the single stereo disparity.

(H) The method denoted as (G), further including deducing, for each pixel in the color reference image, a depth of a portion of the scene associated with the pixel in the color reference image from the single stereo disparity.

(I) The methods denoted as (A) through (H), wherein the at least one additional image includes at least one gray scale image.

(J) The method denoted as (I), wherein gray scale information of the unitary color image is determined from the at least one gray scale image.

(K) The methods denoted as (I) and (J), wherein the at least one gray scale image and the unitary color image have higher spatial resolution than the color reference image.

(L) The methods denoted as (A) through (H), wherein the at least one additional image include a plurality of spectrally selective images, wherein (a) the plurality of spectrally selective images represents a respective plurality of portions of the spectral range covered by the color reference image, and (b) the plurality of portions, taken in combination, comprising the spectral range covered by the color image.

(M) The method denoted as (L), wherein the gray scale information of the unitary color image is determined from the plurality of spectrally selective images.

(N) The methods denoted as (L) and (M), wherein plurality of spectrally selective images and the unitary color image have higher spatial resolution than the color reference image.

(O) The methods denoted as (A) through (N), wherein the unitary color image is registered to the color reference image.

(P) The methods denoted as (A) through (O), further including generating a depth map registered to the unitary color image.

(Q) A camera system including a camera array for capturing a plurality of images of a scene from a plurality of vantage points, the camera array comprising at least one color camera with a Bayer type color filter array.

(R) The system denoted as (Q) further including a processor.

(S) The system denoted as (R) further including a memory communicatively coupled to the processor.

(T) The system denoted as (S) further including an image combination module, comprising machine-readable instructions stored in the memory, that, when executed by the processor, generate a unitary color image of the scene with color information obtained exclusively from the image captured by a selected one of the at least one color camera.

(U) The systems denoted as (Q) through (T), wherein the camera array further includes at least one monochrome camera.

(V) The system denoted as (T), wherein (a) the camera array further includes at least one monochrome camera, and (b) the image combination module is further adapted to obtain gray scale information of the unitary color image from images captured by the at least one monochrome camera.

(W) The systems denoted as (Q) through (T), wherein the camera array further includes a plurality of spectrally selective cameras sensitive to a respective portion of the spectral range of the selected one of the at least one color camera, and the plurality of spectrally selective cameras, taken in combination, is sensitive to at least the spectral range of the selected one of the at least one color camera.

(X) The system denoted as (T), wherein (a) the camera array further includes a plurality of spectrally selective cameras sensitive to a respective portion of the spectral range of the selected one of the at least one color camera, and the plurality of spectrally selective cameras, taken in combination, is sensitive to at least the spectral range of the selected one of the at least one color camera, and (b) the image combination module is further adapted to obtain gray scale information of the unitary color image from images captured by the plurality of spectrally selective cameras.

(Y) The systems denoted (S) through (X), further including a depth module, comprising machine-readable instructions stored in the memory, that, when executed by the processor, generate a depth map of the scene.

(Z) The system denoted as (Y), wherein the depth map is registered to the unitary color image.

(AA) The systems denoted as (S) through (Z), further including a registration module, comprising machine-readable instructions stored in the memory, that, when executed by the processor, generates registration data, expressed in terms of a single stereo disparity for each pixel in the image captured by the selected one of the at least one color camera, using calibration data stored in the memory.

(AB) The system denoted as (AA), wherein the calibration data includes relations between stereo disparities associated with different pairs of cameras of the camera array.

(AC) The systems denoted as (T) through (AB), wherein the unitary color image is registered to the image captured by a selected one of the at least one color camera.

(AD) A system for processing a plurality of images of a scene recorded from different vantage points, where the plurality of images includes a color reference image captured by a Bayer type camera and at least one additional image.

(AE) The system denoted as (AD) including a processor.

(AF) The system denoted as (AE) further including a memory communicatively coupled to the processor.

(AG) The system denoted as (AF), further including an image combination module, comprising machine-readable instructions stored in the memory, that, when executed by the processor, generate a unitary color image of the scene with color information obtained exclusively from the color reference image.

(AH) The systems denoted as (AD) through (AG), wherein the plurality of images includes at least one monochrome image.

(AI) The system denoted as (AG), wherein (a) the plurality of images includes at least one monochrome image, and (b) the image combination module is further adapted to obtain gray scale information of the unitary color image from the at least one monochrome image.

(AJ) The systems denoted as (AD) through (AG), wherein the plurality of images includes a plurality of spectrally selective images representative of a respective portion of the spectral range of the color reference image, and the plurality of spectrally selective images, taken in combination, is representative of at least the spectral range of the color reference image.

(AK) The system denoted as (AI), wherein (a) the plurality of images includes a plurality of spectrally selective images representative of a respective portion of the spectral range of the color reference image, and the plurality of spectrally selective images, taken in combination, is representative of at least the spectral range of the color reference image, and (b) the image combination module is further adapted to obtain gray scale information of the unitary color image from the spectrally selective images.

(AL) The systems denoted as (AF) through (AK), further including a depth module, having machine-readable instructions stored in the memory, that, when executed by the processor, generate a depth map of the scene.

(AM) The system denoted as (AL), wherein the depth map is registered to the color reference image.

(AN) The systems denoted as (AF) through (AM), further including a registration module, comprising machine-readable instructions stored in the memory, that, when executed by the processor, generate registration data, expressed in terms of a single stereo disparity for each pixel in the color reference image, using calibration data stored in the memory.

(AO) The system denoted as (AN), wherein the calibration data includes relations between stereo disparities associated with different pairs of images from the plurality of images.

(AP) The systems denoted as (AG) through (AO), wherein the unitary color image is registered to the color reference image.

Changes may be made in the above methods and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for processing a plurality of images of a scene recorded from different vantage points, the plurality of images comprising a single color reference image captured by a single one and only one Bayer type camera and at least two gray scale images respectively captured by at least two monochrome cameras, the method comprising:
   registering at least a portion of the plurality of images;
   generating a unitary color image from the plurality of images, color information of the unitary color image being determined exclusively from the single color reference image captured by the one and only one Bayer type camera, said generating including
   (a) setting intensity of each pixel of the unitary color image to a weighted average of corresponding pixels of each of the at least two gray scale images, and
   (b) setting color of each pixel of the unitary color image to color of corresponding pixel of the single color reference image; and
   generating a depth map based upon (a) the color reference image and the at least two gray scale images and (b) stereo disparity between the color reference image and the at least two gray scale images caused by the different vantage points.

2. The method of claim 1, wherein the unitary color image is registered to the color reference image.

3. The method of claim 2, further comprising registering the depth map to the unitary color image.

4. The method of claim 1, the step of registering comprising, for each pixel in the color reference image:
   finding one or more corresponding locations in the at least two gray scale images, each corresponding location belonging to a different one of the at least two gray scale images and representing the same portion of the scene as the pixel in the color reference image; and
   determining a single stereo disparity, caused by the different vantage points and associated with the pixel in the color reference image, based on all of the one or more corresponding locations.

5. The method of claim 4, the step of determining a single stereo disparity comprising, when a pixel in the color reference image has a plurality of corresponding locations:
   calculating a plurality of stereo disparities, each being the shift of a respective one of the plurality of corresponding locations relative to the pixel in the color reference image;
   invoking one or more known relationships between the plurality of stereo disparities to eliminate all but the single stereo disparity;
   solving a system of equations, expressed by the single stereo disparity, known coordinates of the pixel in the color reference image, and known coordinates of all of the corresponding locations, to determine the single stereo disparity.

6. The method of claim 5, further comprising, deducing, for each pixel in the color reference image, a depth of a portion of the scene associated with the pixel in the color reference image from the single stereo disparity.

7. The method of claim 1, in the step of generating a unitary color image, gray scale information of the unitary color image being determined from the at least two gray scale images.

8. The method of claim 7, the at least two gray scale images and the unitary color image having higher spatial resolution than the color reference image.

9. The method of claim 1, the at least two gray scale images comprising a plurality of spectrally selective images, wherein (a) the plurality of spectrally selective images represents a respective plurality of portions of the spectral range covered by the color reference image, and (b) the plurality of portions, taken in combination, comprising the spectral range covered by the unitary color image.

10. The method of claim 9, the gray scale information of the unitary color image being determined from the plurality of spectrally selective images.

11. The method of claim 10, the plurality of spectrally selective images and the unitary color image having higher spatial resolution than the color reference image.

12. A camera system comprising:
   a camera array comprising a single Bayer type camera and at least two monochrome cameras, the Bayer type camera and each of the at least two monochrome cameras being configured to capture a respective plurality of images of a scene from a respective plurality of different vantage points;
   a processor;
   a memory communicatively coupled to the processor;
   an image combination module, comprising machine-readable instructions stored in the memory, that, when executed by the processor, generate a unitary color image of the scene with color information obtained exclusively from a single image captured by the single Bayer type camera, the image combination module being adapted to (a) obtain gray scale information of the unitary color image from images captured by the at least two monochrome cameras and (b) set intensity of each pixel of the unitary color image to a weighted average of intensities of corresponding pixels of images captured by each of the at least two monochrome cameras; and
   a depth module comprising machine-readable instructions stored in the memory, that, when executed by the processor and based upon stereo disparity between the plurality of images caused by the respective plurality of different vantage points, generate a depth map of the scene from information obtained from both the Bayer type camera and the at least two monochrome cameras.

13. The system of claim 12, the at least two monochrome cameras comprising a plurality of spectrally selective cameras sensitive to a respective portion of the spectral range of the Bayer type camera, and the plurality of spectrally selective cameras, taken in combination, being sensitive to at least the spectral range of the Bayer type camera.

14. The system of claim 12, the depth module being configured to register the depth map to the unitary color image.

15. The system of claim 12, further comprising:
a registration module comprising machine-readable instructions stored in the memory, that, when executed by the processor, generate registration data, expressed in terms of a single stereo disparity, caused by the different vantage points, for each pixel in the image captured by the Bayer type camera, using calibration data stored in the memory, the calibration data comprising relations between stereo disparities associated with different pairs of cameras of the camera array.

16. A system for processing a plurality of images of a scene recorded from a respective plurality of different vantage points, the plurality of images comprising a single color reference image captured by one and only one Bayer type camera and at least two gray scale images captured by at least two respective monochrome cameras, the system comprising:
a processor;
a memory communicatively coupled to the processor;
an image combination module comprising machine-readable instructions stored in the memory, that, when executed by the processor, process the plurality of images to generate a unitary color image of the scene with color information obtained exclusively from the single color reference image captured by the one and only one Bayer type camera, the unitary color image being registered to the color reference image, the image combination module being adapted to set intensity of each pixel of the unitary color image to a weighted average of intensities of corresponding pixels of images captured by each of the at least two gray scale images; and
a depth module comprising machine-readable instructions stored in the memory, that, when executed by the processor and based upon stereo disparity between the plurality of images caused by the respective plurality of different vantage points, generate a depth map of the scene from the color reference image and the at least two gray scale images.

17. The system of claim 16,
the depth module further being configured to register the depth map to the color reference image.

18. The system of claim 16, further comprising:
a registration module comprising machine-readable instructions stored in the memory, that, when executed by the processor, generate registration data, expressed in terms of a single stereo disparity, caused by the different vantage points, for each pixel in the color reference image, using calibration data stored in the memory, the calibration data comprising relations between stereo disparities associated with different pairs of images from the plurality of images.

19. The method of claim 1, the at least two gray scale images including a first image captured by a first camera sensitive to red light only, a second image captured by a second camera sensitive to green light only, and a third image captured by a third camera sensitive to blue light only, the step of setting intensity of each pixel comprising setting intensity of each pixel of the unitary color image to a weighted average of (a) a corresponding pixel of the first image, (b) a corresponding pixel of the second image, and (c) a corresponding pixel of the third image.

20. The method of claim 1, the step of setting intensity comprising defining intensities of the unitary color image at pixel resolution greater than pixel resolution of the color reference image.

21. The system of claim 12, the at least two monochrome cameras including a first camera sensitive to red light only, a second camera sensitive to green light only, and a third camera sensitive to blue light only.

22. The system of claim 16, the at least two gray scale images including a first image captured by a first camera sensitive to red light only, a second image captured by a second camera sensitive to green light only, and a third image captured by a third camera sensitive to blue light only, the image combination module being adapted to set the intensity of each pixel of the unitary color image to a weighted average of (a) a corresponding pixel of the first image, (b) a corresponding pixel of the second image, and (c) a corresponding pixel of the third image.

* * * * *